(12) United States Patent
Savchenko et al.

(10) Patent No.: US 7,783,717 B1
(45) Date of Patent: *Aug. 24, 2010

(54) SYSTEM AND METHOD FOR A WEB SERVICE CLIENT FRAMEWORK

(75) Inventors: Valdimir Savchenko, Sofia (BG); Timm Falter, Sinsheim (DE); Alexander Zubev, Sofia (BG)

(73) Assignee: SAP AG, Waldorf (DE)

( * ) Notice: Subject to any disclaimer, the term of this patent is extended or adjusted under 35 U.S.C. 154(b) by 1499 days.

This patent is subject to a terminal disclaimer.

(21) Appl. No.: 10/749,772

(22) Filed: Dec. 30, 2003

(51) Int. Cl.
*G06F 15/16* (2006.01)
*G06F 9/46* (2006.01)

(52) U.S. Cl. .................. 709/217; 719/330; 719/331; 719/332; 709/218; 709/219

(58) Field of Classification Search ......... 709/227–228, 709/201, 203; 707/10; 719/330–332; 717/176–177
See application file for complete search history.

(56) References Cited

U.S. PATENT DOCUMENTS

| 7,047,243 B2 * | 5/2006 | Cabrera et al. ............. 707/10 |
| 7,246,358 B2 * | 7/2007 | Chinnici et al. ............ 719/315 |
| 7,404,188 B2 * | 7/2008 | Luty et al. ................. 719/315 |
| 7,475,145 B2 * | 1/2009 | Blizniak et al. ............ 709/227 |
| 7,487,513 B1 * | 2/2009 | Savchenko et al. ......... 719/320 |
| 2003/0126136 A1 * | 7/2003 | Omoigui ..................... 707/10 |
| 2003/0204645 A1 * | 10/2003 | Sharma et al. ............. 709/328 |
| 2004/0024731 A1 * | 2/2004 | Cabrera et al. ............. 707/1 |
| 2004/0044656 A1 * | 3/2004 | Cheenath .................. 707/3 |
| 2004/0111525 A1 * | 6/2004 | Berkland et al. ........... 709/231 |
| 2004/0172555 A1 * | 9/2004 | Beringer et al. ............ 713/201 |
| 2004/0199636 A1 * | 10/2004 | Brown et al. ............... 709/227 |
| 2006/0253420 A1 * | 11/2006 | Hinton et al. .............. 707/2 |
| 2007/0073769 A1 * | 3/2007 | Baikov et al. .............. 707/104.1 |

OTHER PUBLICATIONS

"The Authoritative Dictionary of IEEE Standard Terms." 7th ed. 2000.*
Knutson, J., and H. Kreger. 2002. Web Services for J2EE, Version 1.0. Public Draft v0.3. IBM. Available online via <http://www-3.ibm.com/software/solutions/webservices/pdf/websvcs-0_3-pd.PDF>.*

* cited by examiner

*Primary Examiner*—Joseph Thomas
*Assistant Examiner*—Brendan Higa
(74) *Attorney, Agent, or Firm*—Blakely Sokoloff Taylor & Zafman

(57) ABSTRACT

An application server may include a Web service client having a service endpoint interface. The service endpoint interface may expose a method of a Web service to the Web service client. The Web service client may also include a logical port to define a configuration of the service endpoint interface.

25 Claims, 34 Drawing Sheets

```
//Source File Name: CalendarService.java import com.sap.engine.services.webservices.jaxrpc.wsdl2java.lpapi.LogicalPortType;
import java.rmi.Romte;
import javax.xml.rpc.Service;
import javax.xml.rpc.ServiceException;

public interface CalendarService
    extends Service
{ public abstract CalendarServiceViDocument getLogicalPort(String s)
        throws ServiceException;

public abstract CalendarServiceViDocument getLogicalPort()
        throws ServiceException;

public abstract Remote getLogicalPort(String s, Class class 1)
        throws ServiceException;

public abstract Remote getLogicalPort(Class class 1)
        throws ServiceException;

public abstract String[] getLogicalPortNames();

public abstract LogicalPortType getLogicalPortConfigurations(String s);
}
```

- 2010: import statements
- 2020: getLogicalPort (CalendarServiceViDocument) methods
- 2030: getLogicalPort (Remote) methods
- 2040: getLogicalPortNames
- 2050: getLogicalPortConfigurations

```
//Source File Name: CalendarServiceViDocument.java import java.rmi.Romte;
import java.rmi.RomteException;
import java.util.Calendar;
import javax.xml.rpc.Stub;
import test.types.CalendarComplex;

public interface CalendarServiceViDocument
    extends Remote, Stub
{ public abstract Calendar echoCalendar(Calendar calendar)
        throws RemoteException;

public abstract Calendar[] echoCalendarArray(Calendar acalendar[])
        throws RemoteException;

public abstract Calendar echoDate(Calendar calendar)
        throws RemoteException;

public abstract Calendar[] echoDateArray(Calendar acalendar[])
        throws RemoteException;

public abstract Calendar[] echoGCalendarArray(Calendar acalendar[])
        throws RemoteException;

public abstract Calendar echoGregorianCalendar(Calendar calendar)
        throws RemoteException;

public abstract CalendarComplex echoTimeAtrributes(CalendarComplex calendarcomplex)
        throws RemoteException;

}
```

- 2110: import block
- 2120: echoCalendar
- 2121: echoCalendarArray
- 2122: echoDate
- 2123: echoDateArray
- 2124: echoGCalendarArray
- 2125: echoGregorianCalendar
- 2126: echoTimeAtrributes
- 2100

FIG. 21

```xml
<?xml version="1.0" encoding="utf-8"?>
```
2210 → `<LogicalPorts Name='CalendarService'>`

2220 →    `<LogicalPort`

2231 →       Name='CalendarServiceSoapPortrpc_enc'
2232 →       Endpoint='http://localhost:80/CalendarService/CalendarServiceSoap?style=rpc_enc'
2233 →       BindingName='CalendarServiceSoapBinding'
2234 →       BindingUri='CalendarServiceSoapBinding'
      BindingImplementation='SOAP 1.1 HTTP Binding with Attachments'
2235 →       StubName='Calendarservice.CalendarServiceSoapBinding_Stub'
2236 →       Default='false'>

`</LogicalPort>`

`</LogicalPorts>`

```
<?xml version="1.0" encoding="utf-8"?>
```
2310 → `<nsl: ws-clients-deployment-descriptor version = "Ver. #" xmlns: nsl= "URI for the namespace">`

2320 → `<service-ref>`

2331 → `<service-ref-name>test.Test</service-ref-name>`

2332 → `<service-interface>test.CalendarService</service-interface>`

2333 → `<package-name>test</package-name>`

2334 → `<wsdl-file>wsdlroot_1_1_0.wsdl</wsdl-file>`

2335 → `<logical-ports-file>lports_1.xml</logical-ports-file>`

2336 → `<uri-mapping-file>mappings_1_1.properties</uri-mapping-file>`

2337 → `<package-mapping-file>package_mapping_1.properties</package-mapping-mapping-file>`

`</service-ref>`

`</nsl: ws-clients-deployment-descriptor>`

SYSTEM AND METHOD FOR A WEB SERVICE CLIENT FRAMEWORK

TECHNICAL FIELD

Embodiments of the invention generally relate to the field of Web services and, more particularly, to a system and method for a Web service client framework.

BACKGROUND

Web services are, in general terms, computer software (or, for ease of reference, software) based services that are provided over a network (e.g., the Internet). More specifically, Web services are self-contained, modularized, executable entities that can be published, searched for, and accessed across a network. Web services are portable across disparate computing platforms because they are implemented according to widely accepted standards.

FIG. 1 is a block diagram of the basic architecture of a conventional Web services framework 100. Conventional Web services framework 100 includes service provider 110, service consumer 120, and service directory 130. Service provider 110 may be, for example, a Web application server that is implemented according to any of the Java 2 Enterprise Edition Specifications, for example, v1.3, published on Jul. 27, 2001 (hereinafter, the J2EE Standard). One or more Web services are deployed on service provider 110. These Web services comply, at least in part, with the basic Web services standards including: the Extensible Markup Language (XML) standard promulgated by the World Wide Web Consortium (W3C) entitled, "Extensible Markup Language (XML) 1.0 (Second Edition)," 6 Oct. 2000 (hereinafter, the XML Standard) and the Simple Object Access Protocol (SOAP) promulgated by the W3C entitled, "SOAP Version 1.1 Part 1: Messaging Framework and Part 2: Adjuncts," 24 June 2003 (hereinafter, the SOAP Protocol).

Service provider 110 publishes one or more Web services on service directory 130 via Web Service Definition Language (WSDL) document 140. A WSDL document may be a document that complies, at least in part, with any of the WSDL standards, for example, the WSDL standard promulgated by W3C entitled, "Web Services Description Language 1.1," 15 Mar. 2001 (hereinafter, the WSDL Standard). WSDL document 140 is an XML document that provides pertinent information about a Web service such as its name, the methods that can be called, the parameters for the methods, and a location for sending requests.

Service registry 130 is a registry and discovery service for Web services. Service registry 130 may implement one of the Universal, Discovery, Description, and Integration of Web services (UDDI) specifications, for example, UDDI Version 3.0, Published Specification, Dated 19 Jul. 2002 (hereinafter, the UDDI Specification). The UDDI Specification defines a set of SOAP messages that are used to access XML-based data (e.g., WSDL document 140) in a registry. The UDDI Specification also defines a registry information model to structure the data stored in service directory 130 and to make it easier to search and navigate.

Service consumer 120 is a computing device that locates and uses a Web service published in service registry 130. Service consumer 120 may be, for example, a Web application server, a general-purpose computer, personal digital assistant, telephone, and the like. Service consumer 120 may implement the UDDI Specification to find and retrieve WSDL document 140. Service consumer 120 may generate a Web service client (not shown) based on WSDL document 140. The generated Web service client may then access the Web service from service provider 110 via, for example, the Internet.

In some cases, it may be advantages to provide separate configurations for a generated Web service client. For example, if there is only one configuration of the Web service client then all users of the Web service client have the same security settings, transport guarantee settings, etc. Similarly, the processing of message traffic between service consumer 120 and service provider 110 may be enhanced if the Web service client includes a flexible mechanism for defining multiple configurations of the Web service client.

SUMMARY OF THE INVENTION

A computing device may include a Web service client to access a Web service. The Web service client may include a service endpoint interface to expose a method of the Web service to a client application. The Web service client may also include one or more logical ports between the service endpoint interface and the client application to define one or more configurations for the service endpoint interface.

BRIEF DESCRIPTION OF THE DRAWINGS

Embodiments of the invention are illustrated by way of example, and not by way of limitation, in the figures of the accompanying drawings in which like reference numerals refer to similar elements.

FIG. 20 illustrates selected elements of an exemplary service interface class 2000 for the calendar Web service illustrated in FIGS. 9 through 13B.

FIG. 21 illustrates selected elements of an exemplary service endpoint interface class 2100 for the calendar Web service.

FIG. 22 illustrates selected elements of an exemplary logical port file 2200 for the calendar Web service.

FIG. 23 illustrates selected elements of exemplary deployment descriptor file 2300, implemented according to an embodiment of the invention.

DETAILED DESCRIPTION

Embodiments of the invention are generally directed to a system and method for a Web service client framework. In an embodiment, a computing device may access a logical port to define a configuration of a service endpoint interface. The term "computing device" broadly refers to, for example, a desktop computer, laptop computer, tablet computer, handheld computer, personal digital assistant, telephone, household appliance, server, client, application server, and the like. The computing device may select an item of configuration information in the accessed logical port. As is further described below, in one embodiment, the computing device may provide a value for the selected item of configuration information to define, at least in part, a configuration of the service endpoint interface.

Figure 2:
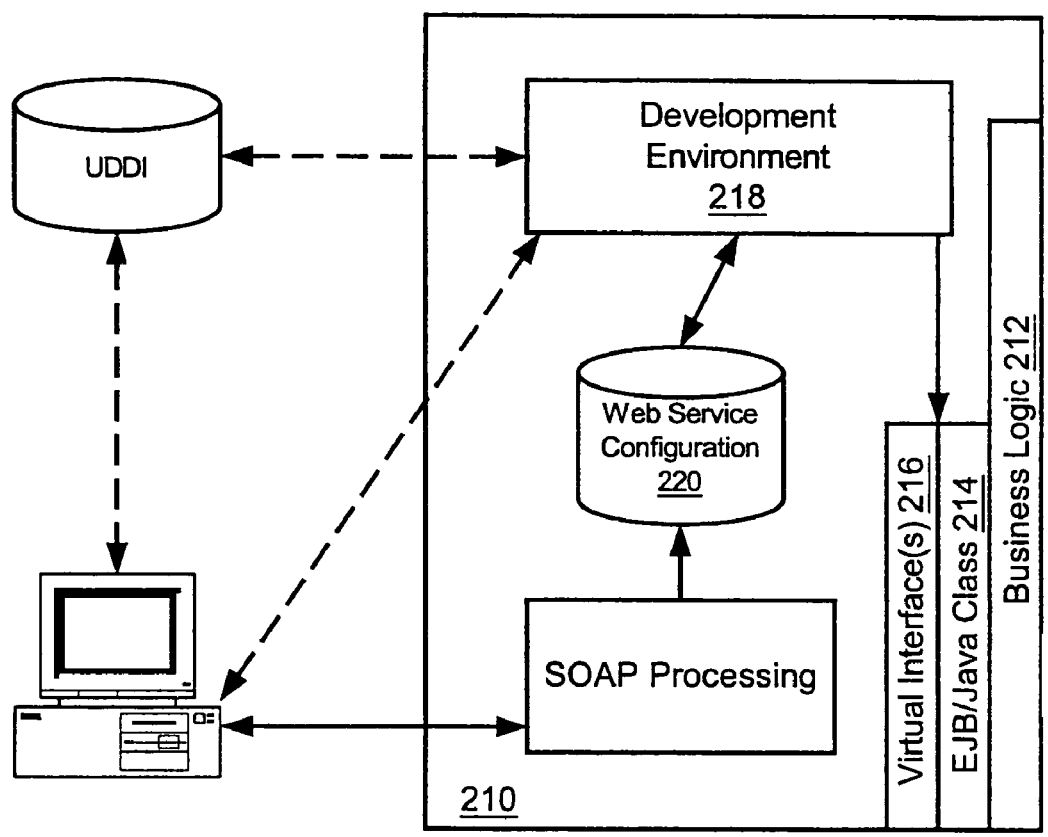
FIG. 2 is a block diagram of selected elements of an exemplary Web service provider 210, implemented according to an embodiment of the invention.

FIG. 2 is a block diagram of selected elements of an exemplary Web service provider 210 implemented according to an embodiment of the invention. Web service provider 210 includes business logic 212, web service implementation 214, virtual interface(s) 216, development environment 218, and Web service configurations 220. The term "business logic" refers to software that performs data processing. Business logic 212 may provide the operations that are packaged as a Web service.

In an embodiment, Web service implementation 214 is the actual logic provided in each Web service. Web service implementation 214 is called an "endpoint" of the Web service because it processes requests and/or provides responses. Virtual interface 216 is an abstract interface that provides a mechanism to define several views of Web service implementation 214 and to publish each view separately as a Web service. Web service configuration 220 specifies technical features of a Web service such as which transport binding to use. Web service implementation 214, virtual interface 216, and Web service configuration 220 are further described below with reference to FIG. 4.

Development environment 218 provides a software development environment for writing computer software. In an embodiment, Web service implementation 214, virtual interface 216, and/or Web service configuration 220 are developed in development environment 218. In an embodiment, development environment 218 is an implementation of, at least in part, the Eclipse Platform available under the Common Public License from the Eclipse Consortium (www.eclipse.org). In an alternative embodiment, development environment 218 may be a different development environment.

Figure 3:
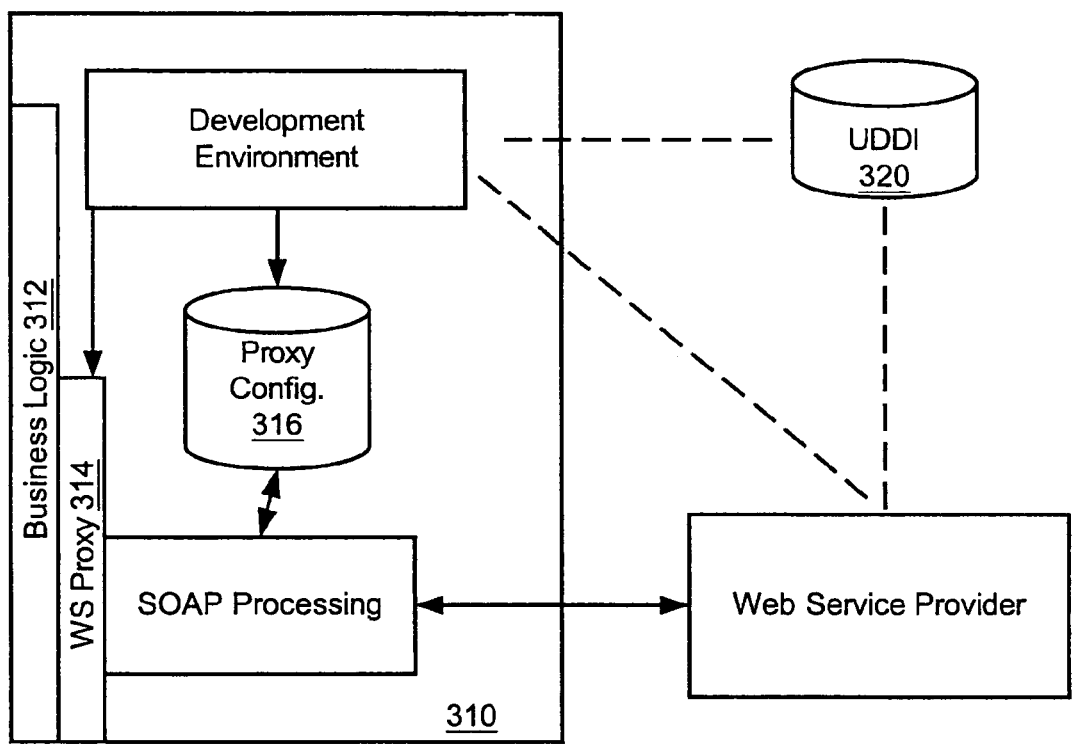
FIG. 3 is a block diagram of selected elements of an exemplary Web service consumer 310, implemented according to an embodiment of the invention.

FIG. 3 is a block diagram of selected elements of an exemplary Web service consumer 310, implemented according to an embodiment of the invention. In an embodiment, Web service consumer 310 includes business logic 312, Web service proxy 314, and proxy configuration 316. Business logic 312 may include an application(s) that sends a request for service to a Web service. The term "application" refers to software that performs work, such as data creation or manipulation.

In an embodiment, Web service proxy 314 is a local object that represents a Web service. Business logic 312 may access the Web service by invoking a method(s) in Web service proxy 314. In an embodiment, proxy configuration 316 specifies technical features of Web service proxy 314 such as which transport binding to use. Web service proxy 314 and proxy configuration 316 may be generated based, at least in part, on the information in a WSDL document that is downloaded from UDDI directory 320. As is further described below with reference to FIG. 6, proxy configuration 316 may map abstract features of the Web service to technical features implemented in Web service consumer 310.

Figure 4:
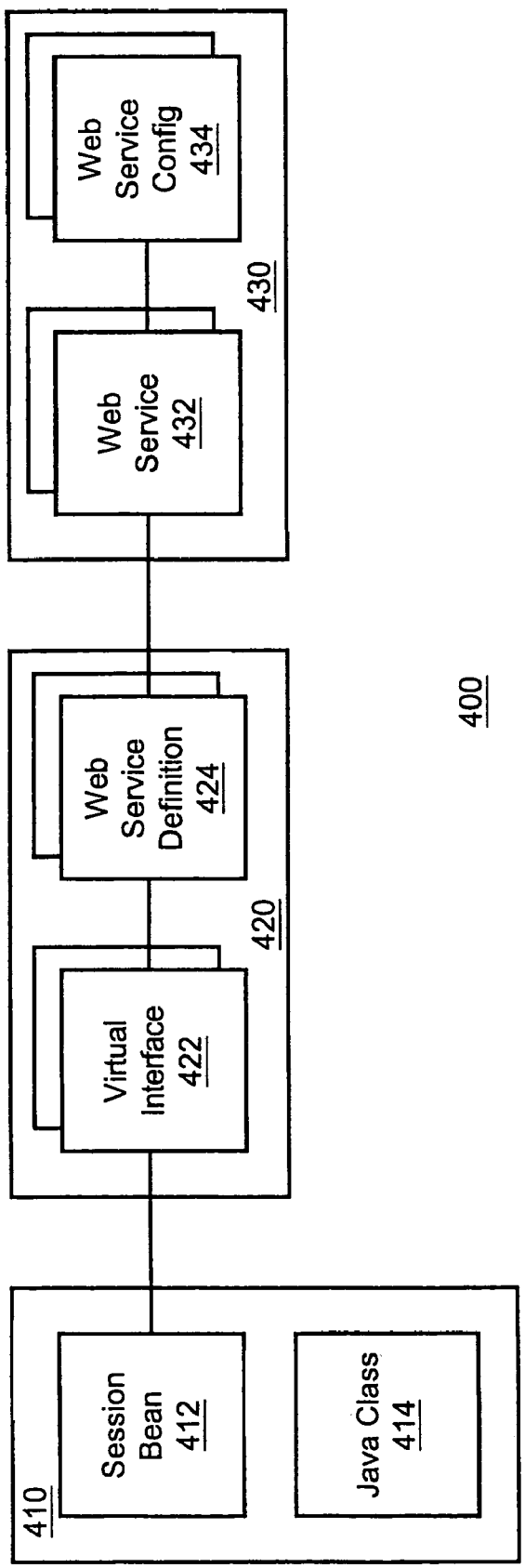
FIG. 4 is a block diagram of the general architecture of Web service 400, implemented according to an embodiment of the invention.

FIG. 4 is a block diagram of the general architecture of Web service 400, implemented according to an embodiment of the invention. The illustrated embodiment includes Web service implementation 410, Web service design time part 420, and Web service configuration part 430. In alternative embodiments, the general architecture of a Web service may include more elements, fewer elements, and/or different elements. The architecture of Web service 400, as shown in FIG. 4, may be referred to as an "inside-out" architecture. The term "inside-out" refers to first developing Web service implementation 410 and then developing one or more Web service design time parts 420 and one or more Web service configuration parts 430 for Web service implementation 410.

In contrast to the architecture shown in FIG. 4, many conventional Web service have an "outside-in" architecture. An "outside-in" architecture refers to starting with a Web service design time part (e.g., Web service design time part 420) and developing a Web service implementation (e.g., Web service implementation 410). The Java Community Process (JCP) organization has promulgated a number of Java Specification Requests (JSRs) that may be implemented, at least in part, by Web service 400. For example, JSR-101 entitled, "Java Application Program Interfaces (APIs) for Extensible Markup Language based Remote Procedure Calls," Oct. 28, 2003 (hereinafter, the JAX-RPC Specification) provides a standard set of Java APIs that provide a foundation for developing and deploying Web services on the Java platform. Similarly, JSR-109, entitled, "Implementing Enterprise Web Services," Nov. 15, 2002 (hereinafter, the JSR-109 Specification) provides mechanisms for deploying a Web service in a Java 2 Platform, Enterprise Edition (J2EE) environment.

Web service implementation 410 is the actual logic behind Web service 400. In an embodiment, enterprise session bean 412 is the logic that provides the methods of Web service 400. The term "enterprise bean" refers to business logic that retrieves and/or processes data and provides that data to, for example, a user. In an alternative embodiment, the business logic may be provided by a different implementation. For example, in an embodiment, Web service implementation 410 is provided by Java class (or Java classes) 414. In yet another alternative embodiment, business logic 410 may be provided by, for example, an application developed in C-sharp. The term "C-sharp" refers to an application developed according to any of the C-sharp programming language platforms including, for example, the C-sharp Language Specification, Mar. 20, 2001.

In an embodiment, Web service design time part 420 provides a description of Web service 400 in terms of abstract features, rather than specific technical implementations. Thus, the developer of Web service design time part 420 may focus on the logic of Web service implementation 410 rather than the actual binding information used to expose Web service 400. In an embodiment, Web service design time part 420 includes virtual interface(s) 422 and Web service definition(s) 424. A WSDL document may be generated and published on, for example, a UDDI directory based on virtual interface 422 and Web service definition 424, in an embodiment of the invention.

Virtual interface 422 is an abstract interface that provides a mechanism for defining multiple views of Web service implementation 410. Virtual interface 422 provides multiple "views" because it selectively exposes methods and parameters of Web service implementation 410. For example, virtual interface 422 may allow a computing device to rename or hide methods and parameters of Web service implementation 410. Also, virtual interface 422 may allow the computing device to define standard values for the parameters of Web service implementation 410. In an embodiment, virtual interface 422 may selectively convert parameter types (e.g., from integer to string). In addition, virtual interface 422 may allow the computing device to define the way the parameters are represented in SOAP messages (e.g., as either an element or an attribute, namespaces, etc.). In an embodiment, multiple virtual interfaces 422 may be implemented for Web service implementation 410. In such an embodiment, each client accessing Web service 400 may have a different view of Web service implementation 410.

In addition, virtual interface 422 provides an abstraction layer over the endpoint types (e.g., an abstraction layer over the underlying EJBs and Java classes). The elements of Web service 400 that follow from virtual interface 422 (e.g., Web service definition 424 and Web service configuration part 430) are based on the abstract metadata of virtual interface 422 rather than implementation 410. Thus, in an embodiment, a SOAP runtime implementation (not shown) is not specific to implementation 410, rather it is based on the generic metadata of, for example, virtual interface 422.

Web service definition 424 is an abstract definition of the capabilities and requirements of Web service 400. In an embodiment, the capabilities of and requirements of Web service 400 are described in terms of abstract features and properties in Web service definition 424. During the configuration of Web service 400, these abstract features and properties may be mapped to specific runtime technical features. In an embodiment, the abstract features and the runtime features mapped to them are the basis for a Web service client (not shown). In an embodiment, each Web service definition 424 references a virtual interface 422 and there may be multiple Web service definitions 424 for each virtual interface 422.

In an embodiment, Web service definition 424 does not contain system specific data (e.g., does not contain application server specific data). Since Web service definition 424 does not contain system specific data, it may be defined once and then transported to a variety of different systems. In an embodiment, transporting Web service definition 424 to a variety of different systems includes transporting Web service definition 424 across multiple scenarios in one system landscape (e.g., from a development system to a test system to a productive system, etc.). In an embodiment, transporting Web service definition 424 to a variety of different systems also includes transporting Web service definition 424 from a provider of Web services to a customer.

An advantage to the architecture of Web service 400 is that a single implementation 410 may be exposed in multiple ways. For example, implementation 410 may have multiple virtual interfaces 422. Each virtual interface 422 (or selected virtual interfaces 422) may, in turn, be defined by one or more Web service definitions 424. In contrast to the architecture of Web service 400, conventional, Web services generate separate implementations based on a single WSDL document.

In an embodiment, Web service configuration part 430 binds an abstract Web service to particular transports, bindings, and protocols. Web service configuration part 430 may include Web service 432 and Web service configuration 434. Web service 432 references Web service definition 424 and provides a container for one or more Web service configurations 434. The term "container" broadly refers to an entity that provides services to another entity. The services provided by a container may include, for example, lifecycle management, security, connectivity, transactions, and/or persistence.

In an embodiment, Web service configuration 434 specifies which transport binding will be used, a security configuration, a target address, and/or documentation for the operations of the configuration. In addition, Web service configuration 434 may specify which design-time feature will be mapped to which runtime feature. The term "design time" refers to the design and development of computer software. The term "runtime" refers to the actual execution of software. In an embodiment, each Web service configuration 434 is mapped to a WSDL port. The term "port" may refer to an association between a port type and a binding. For further information regarding bindings see, for example, the SOAP Specification.

In an embodiment a Web service, at runtime, may have a client-side implementation and a server-side implementation. For ease of reference the client-side implementation is hereinafter referred to as a "Web service client" and the server-side implementation is hereinafter referred to as the "Web service." The role of the Web service client is to expose a method of the Web service to a client application and to send a request for service to the Web service. The role of the Web service is to process the request and provide a response. The Web service and the Web service client are more fully described below with reference to FIGS. 5-7.

Figure 5:
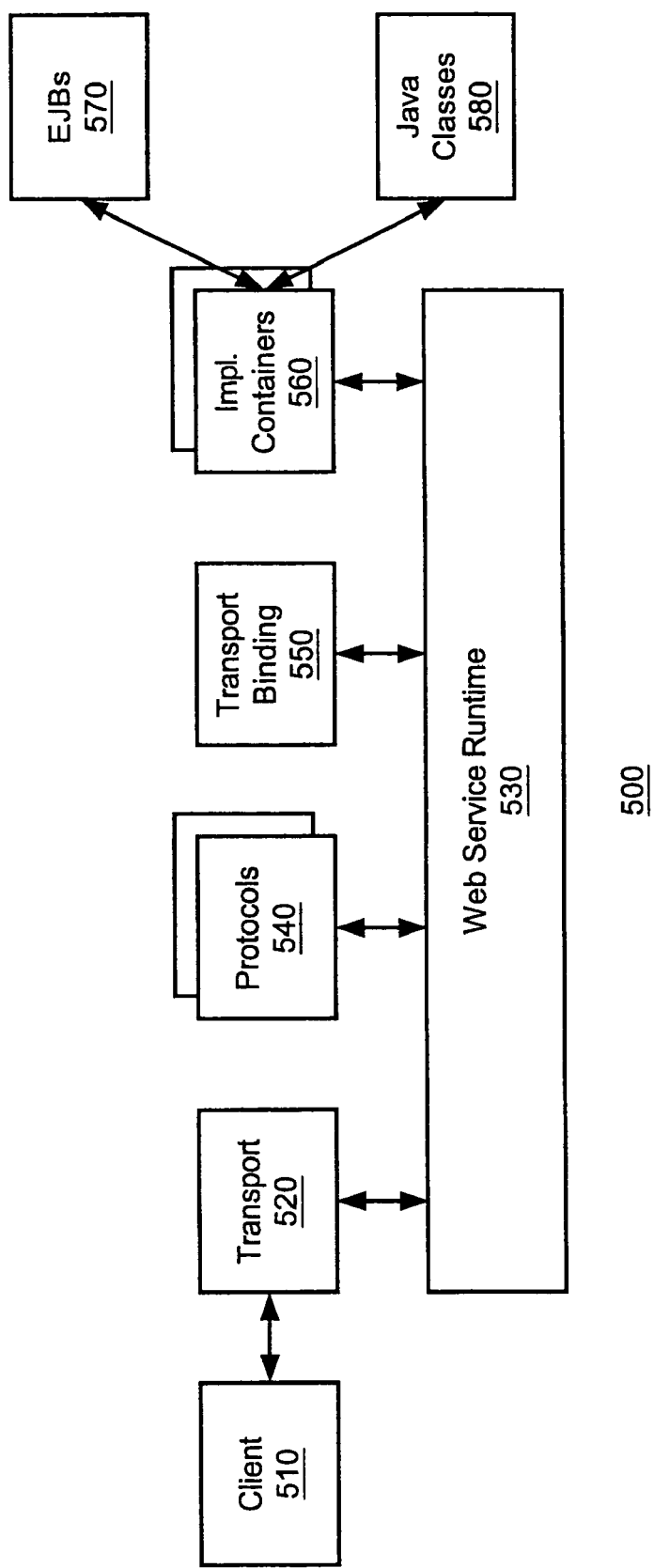
FIG. 5 is a block diagram illustrating selected aspects of the server-side of Web service 500, according to an embodiment of the invention.

FIG. 5 is a block diagram illustrating selected aspects of the server-side of Web service 500, according to an embodiment of the invention. The illustrated embodiment of Web service 500 includes transport 520, Web service runtime 530, protocols 540, transport binding 550, and implementation containers 560. In an alternative embodiment, Web service 500 may include more, fewer, and/or different elements than those shown in FIG. 5. As illustrated in FIG. 5, Web service runtime 530 has a modular architecture. This modular architecture may be extended by, for example, adding (or removing) one or more protocols 540 and/or implementation containers 560. The components of Web service runtime 530 that may be selectively added and/or removed are referred to as "pluggable" components.

In an embodiment, transport 520 is an entity that receives a request for a Web service from client 510 and encapsulates that request in an identifier that specifies a configuration of Web service 500 that should process the received request. The identifier is used by Web service runtime 530 to determine which Web service configuration should process the received request. In an embodiment, a Web service configuration (e.g., Web service configuration 434, shown in FIG. 4) refers, in part, to the combination of protocols 540, transport binding 550, implementation container 560, and/or Web service implementation (e.g., Enterprise Java Bean 570 or Java classes 580) that processes the received request. Transport 520 is further described below with reference to FIG. 32.

Web service runtime 530 takes the received request from transport 520 and determines which Web service configuration to invoke based on the identifier encapsulating the request. In an embodiment, the Web service configuration specifies which protocols 540 should be invoked to process the request. Protocols 540 are pluggable logic elements that process the request. In an embodiment protocols 540 may be security protocols (e.g., authentication and/or authorization protocols), session protocols, transport guarantee protocols, and the like. In an embodiment, protocols 540 are implemented as Java services. Protocols are further discussed below (in a client-side context) with reference to FIG. 7.

The received request may include any of a number of data types and operation types that are mapped (or bound) to a transport layer protocol. In an embodiment, transport binding 550 converts the received request to, for example, Java objects that are used to invoke the Web service implementation (e.g., EJBs 570 or Java classes 580). Implementation containers 560 use the Java objects to invoke the methods of the Web service implementations. After the Web service implementation (e.g., EJBs 570 or Java classes 580) generates a response to the received request, transport binding 580 may convert a Java object representation of the response to a transport layer formatted response.

Figure 6:
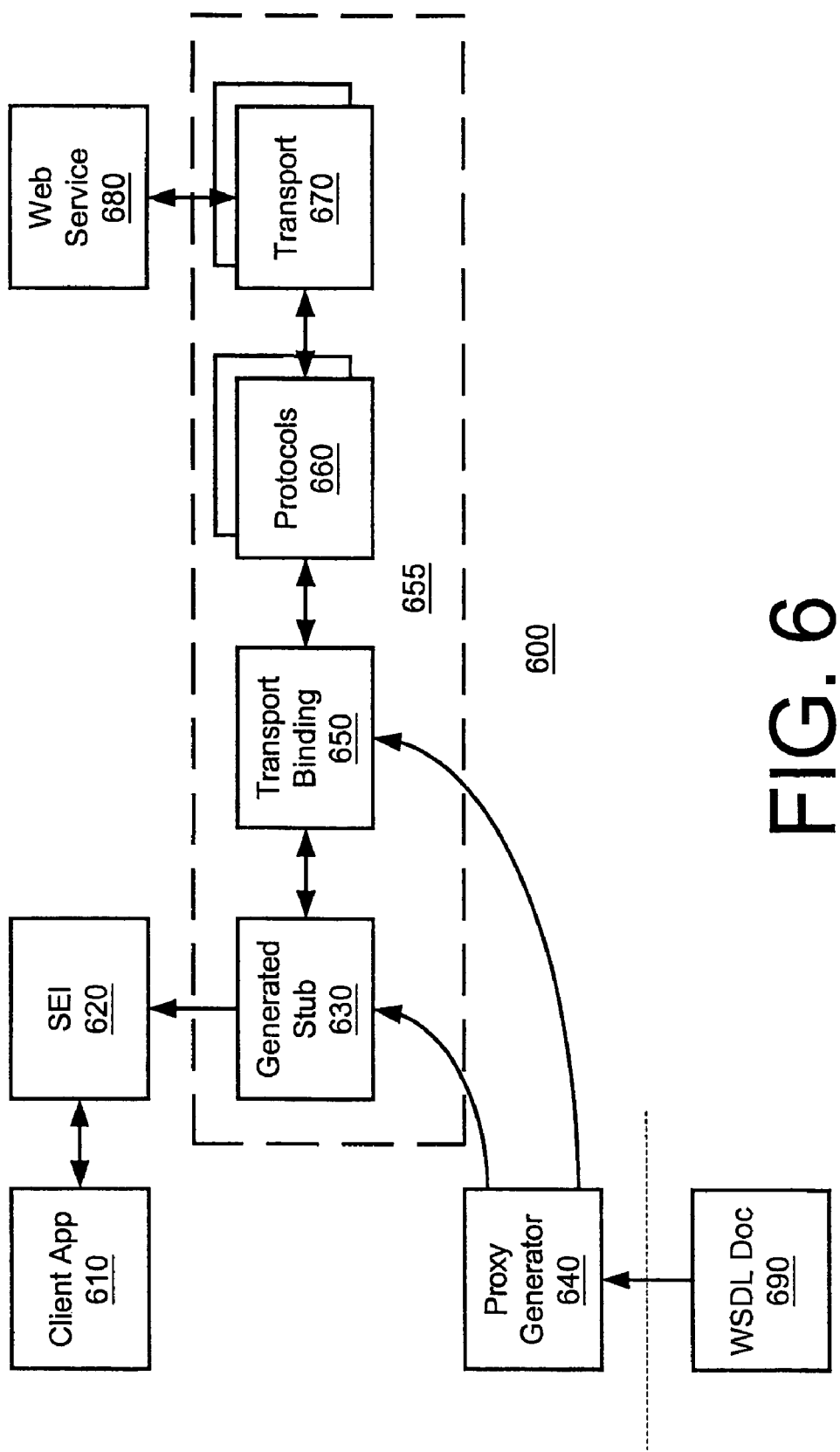
FIG. 6 is a block diagram of the general architecture of Web service client 600, implemented according to an embodiment of the invention.

FIG. 6 is a block diagram of the general architecture of Web service client 600, implemented according to an embodiment of the invention. In an embodiment, Web service client 600 includes client application 610, Service Endpoint Interface (SEI) 620, generated stub 630, proxy generator 640, transport binding 650, protocols 660, and transport 670. In an alternative embodiment, Web service client 600 may include more, fewer, and/or different elements than those shown in FIG. 6. In the illustrated embodiment, Web service client framework 655 is modular and the various elements may, therefore, be referred to as being "pluggable."

Client application 610 may be any application that exchanges a request and/or a response with Web service 680. Client application 610 exchanges requests/responses with Web service 680 through one or more methods exposed by Service Endpoint Interface (SEI) 620. SEI 620 is the local representation of remote Web service 680. In an embodiment, SEI 620 also includes one or more logical ports (not shown) to provide a mechanism to locally configure Web service 680. Logical ports (not shown) are further described below with reference to FIG. 7. For additional information regarding SEI 620 see, for example, the JAX-RPC Specification and the JSR-109 Specification.

Generated stub 630 includes the low-level classes that Web service client 600 uses to communicate with Web service 680. The low-level classes of generated stub 630 implement SEI 620. For additional information regarding generated stub 630 see, for example, the JAX-RPC Specification. Proxy generator 640 parses WSDL document 690 and generates SEI 620 and stub 630 based, at least in part, on the information obtained from WSDL document 690. For additional information regarding proxy generator 640 see, for example, the JAX-RPC Specification and the JSR-109 Specification.

In an embodiment, transport binding 650 is a pluggable component that generates a request message(s) based on the settings of generated stub 630. When transport binding 650 receives a response(s) to the request message it converts the response from, for example, XML to Java objects. In an embodiment, transport binding 650 is implemented as a Java service. For additional information regarding transport binding 650 see, for example, the JAX-RPC Specification and the JSR-109 Specification.

In an embodiment, protocols 660 implement additional features (e.g., non-standardized functionalities) for Web service client 600. Examples of the features that may be implemented by protocols 660 include, but are not limited to, authentication functions, proxy server functions, header functions, and/or session functions. The functions implemented by protocols 660 may be independent of runtime features or may enhance runtime features. In an embodiment, protocols 660 are implemented as pluggable Java services. In an embodiment, protocols 660 use the SOAP message format to process incoming responses and/or outgoing requests. In alternative embodiments, protocols 660 implement a different message format. Client protocols 660 are further described below with reference to FIGS. 15 and 16.

Figure 7:
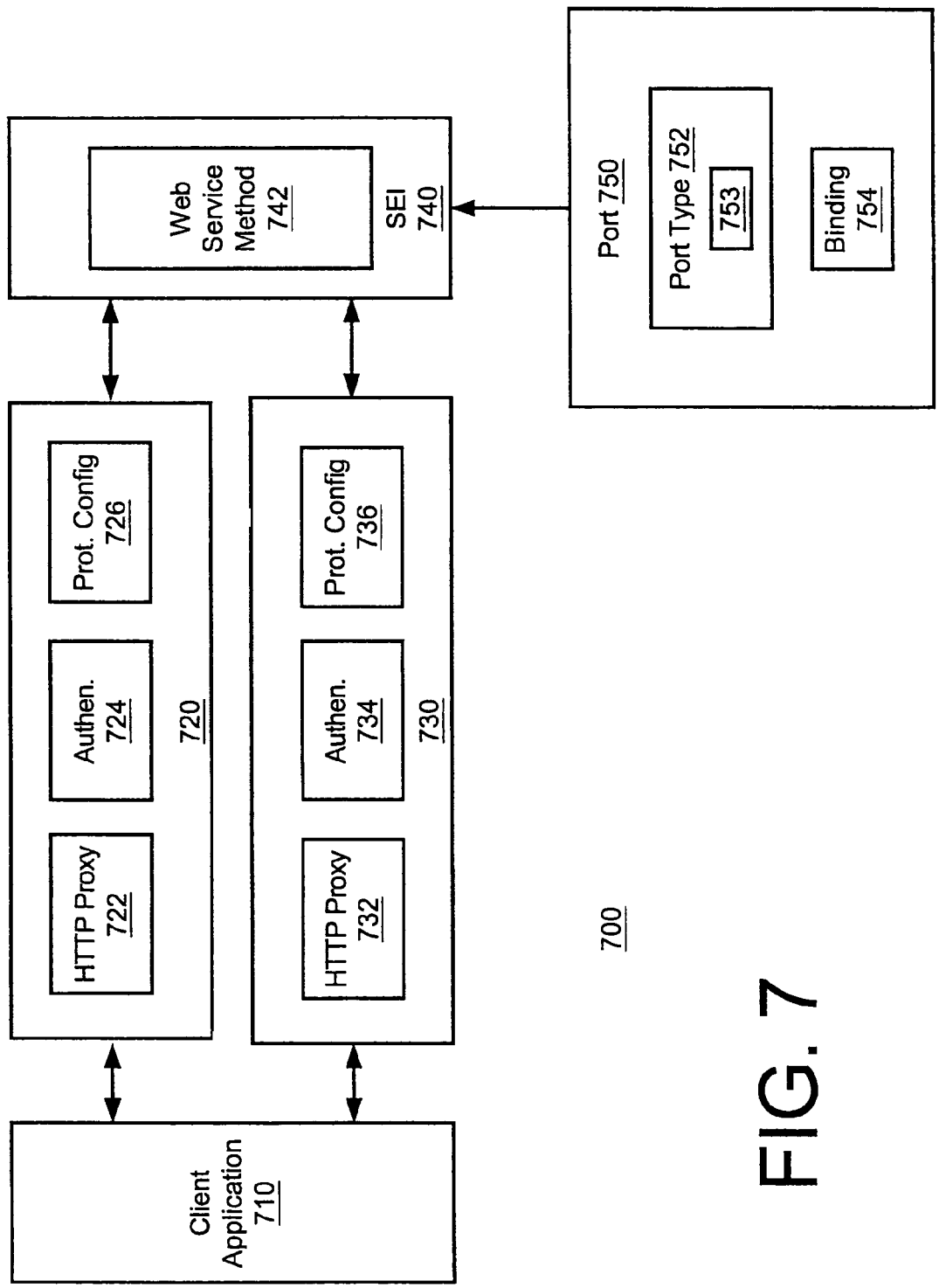
FIG. 7 is a block diagram of selected elements of Web service client 700, implemented according to an embodiment of the invention.

FIG. 7 is a block diagram of selected elements of Web service client 700, implemented according to an embodiment of the invention. Web service client 700 may include client application 710, logical ports 720 and 730, and service endpoint interface 740. In an embodiment, service endpoint interface 740 is generated based on a description of a Web service. In an embodiment, the description of the Web service is a WSDL document. In an embodiment, the description of the Web service includes Port 750 which defines, at least in part, the operations of the Web service and the communication protocols (or bindings) used by the operations. The illustrated embodiment of port 750 includes port type element (or, for ease of reference, port type) 752 and binding element (or, for ease of reference, binding) 754. In an embodiment, port 750 is a WSDL port and port type 752 is a WSDL port type.

In an embodiment, port type 752 defines the operations that are performed by a Web service and the messages that the defined operations use. The illustrated embodiment of port type 752 includes Web service operation (or, for ease of reference, operation) 753. In an embodiment in which port type 752 is a WSDL port type, operation 753 may be, for example, a one-way operation, a request-response operation, a solicit-response operation, and/or a notification operation. Operation 753 defines one or more messages (not shown). Each message may consist of one or more parts. In an embodiment, the messages defined by operation 753 are WSDL messages.

In an embodiment, binding 754 defines message formats and communication protocol details for port 750. In an embodiment, binding 754 specifies a transport protocol to be used. Examples of transport protocols that may be used include, but are not limited to, HyperText Transfer Protocol (HTTP), SOAP over HTTP, SOAP over File Transfer Protocol (FTP), SOAP over Simple Mail Transfer Protocol (SMTP), and the like. The HTTP protocol refers to any of the HTTP protocols including, for example, the protocol described in Request For Comments (RFC) 2616 entitled, "HyperText Transport Protocol HTTP/1.1," June 1999 (hereinafter, the HTTP Protocol). The File Transfer Protocol refers to any of the FTPs including, for example, the FTP described in RFC 959 entitled, "File Transfer Protocol," October 1985. The Simple Mail Transfer Protocol refers to any of the SMTPs including, for example, the SMTP described in RFC 2821 and entitled, "Simple Mail Transfer Protocol," April 2001.

Service endpoint interface 740 provides client application 710 with access to one or more of the operations in port 750. In the illustrated embodiment, service endpoint interface 740 provides Web service method (or, for ease of reference, method) 742 to client application 710. In an embodiment, method 742 is based on operation 753. In an embodiment, service endpoint interface (SEI) 740 is generated (e.g., by proxy generator 640, shown in FIG. 6) based, at least in part, on port type 752.

In an embodiment, logical ports 720 and 730 allow a user to define one or more configurations of SEI 740. User specified configurations of SEI 740 provide a client application with an increased set of features from a Web service and easier access to those features. In an embodiment, logical ports 720 and 730 may be configured without regenerating SEI 740. In addition, since the JSR-109 Specification does not specify security mechanisms such as authentication, logical ports 720 and 730 provide Web service users with a mechanism to secure the exchange of information between a Web service client and a Web service server. In an embodiment, logical ports 720 and 730 allow a computing device to set, for example, an HTTP proxy, user authentication information, and/or protocol configuration. In an alternative embodiment, logical ports 720 and 730 provide the computing device with more, fewer, and/or different configuration settings.

HTTP proxy information 722 and 732 represent HTTP proxy configuration information for logical ports 720 and 730, respectively. In an embodiment, HTTP proxy information 722 and 732 may be used if, for example, communication with a Web service extends beyond a firewall. HTTP proxy information may include, for example, an HTTP proxy host address, an HTTP proxy port identifier, an authorized HTTP proxy user, and/or an HTTP proxy password.

Authentication information 724 and 734 represent authentication information for logical ports 720 and 730 respectively. In an embodiment, authentication information 724 and 734 may be used, for example, to authenticate a message sent between client application 710 and a Web service. In an embodiment, three levels of authentication are supported: none, basic, and strong. The basic level of authentication may include authentication of a user name and password. The strong level of authentication may include client certificates to validate a message. Authentication information may include, for example, specified level of authentication, operations for which authorization is required, security roles, transport protocol type, encryption information and the like.

Protocol information 726 and 736 represent protocol information for client protocol implementations 720 and 730 respectively. In an embodiment, a Web service client includes one or more client protocol implementations (e.g., client protocol implementations 660, shown in FIG. 6). In such an embodiment, protocol information 726 and 736 may include configuration information for the client protocol implementations. Protocol information 726 and 736 may include session information, authentication information, transport guarantee information, protocol names, security information and the like.

In an embodiment a logical port is automatically created for each existing port (e.g., port 750). For example, logical port 720 may be created by default and may copy the features from the underlying port (e.g., port 750) and binding (e.g., binding 754). Logical port 720 may then be copied to generate logical port 730. Alternatively, logical port 730 may be generated based on a different existing or new binding and/or port.

In an embodiment, a Web service homepage is generated for a Web service. The term "homepage" refers to the starting point for a hypertext document on the World Wide Web (or, for ease of reference, the Web). A homepage may be a single Web page or may include two or more Web pages. The term "Web page" refers to a hypertext document that is available via the Internet. A homepage may also include one or more links to other Web-based resources (e.g., other Web pages). The term "link" refers to an address that leads to a Web-based resource. A link may be a Uniform Resource Identifier (URI) implemented according to, for example, the Internet Engineering Task Force (IETF) Request For Comments (RFC) 2396 entitled, "Uniform Resource Identifiers (URI): Generic Syntax," May 1997, Berners-Lee, R. Fielding, L. Masinter.

In an embodiment, a separate Web service homepage is generated for each Web service configuration (as discussed above, each Web service may have more than one configuration). A Web service homepage may be automatically or manually generated by, for example, development environment 218, shown in FIG. 2. If the Web service homepage is automatically generated then, in one embodiment, it is automatically generated when a deployed Web service is requested by, for example, a Web service consumer. In an alternative embodiment, the Web service homepage may be automatically generated in response to an event other than requesting the deployed Web service. For example, the Web service homepage may be automatically generated when a Web service is developed, configured, registered with a service directory, discovered in a service directory, etc. In an embodiment, the Web service homepage may be generated when, for example, a request for the Uniform Resource Locator (URL) of a WSDL document is received, sent, and/or passed from one node to another. As is further discussed below, in an embodiment, a Web service homepage displays information that is based, at least in part, on the configuration of the Web service.

Figure 8:
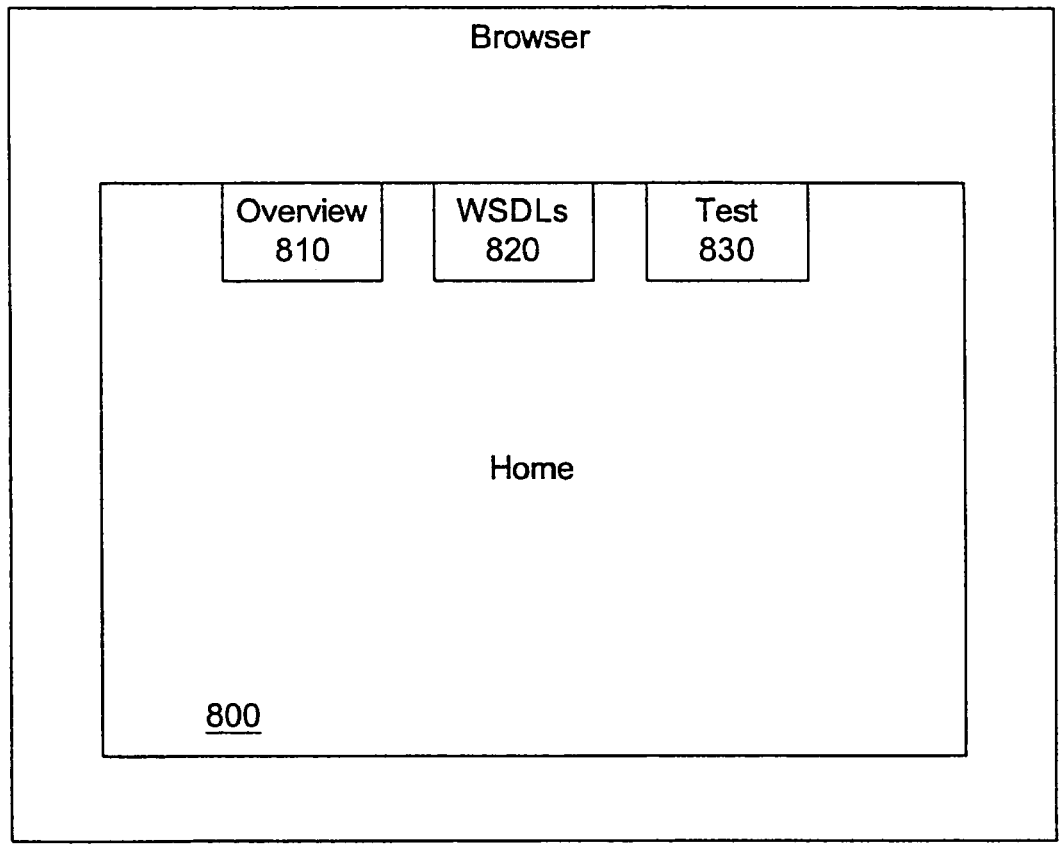
FIG. 8 illustrates Web service homepage 800, implemented according to an embodiment of the invention.

FIG. 8 illustrates Web service homepage 800, implemented according to an embodiment of the invention. The illustrated embodiment of Web service homepage 800, includes overview Web page 810, WSDLs Web page 820, and test Web page 830. In an alternative embodiment, homepage 800 may include more Web pages, fewer Web pages, and/or different Web pages than those illustrated in FIG. 8. In yet another alternative embodiment, Web service homepage 800 may include one or sections, for example, an overview section, a WSDL section, and/or a test section. In FIGS. 9-13, Web service homepage 800 is described as having one or more Web pages (e.g., test Web page 830). In an embodiment in which Web service homepage 800 includes one or more sections rather than one or more Web pages, the below discussion may apply to separate sections rather than separate Web pages.

Figure 9:
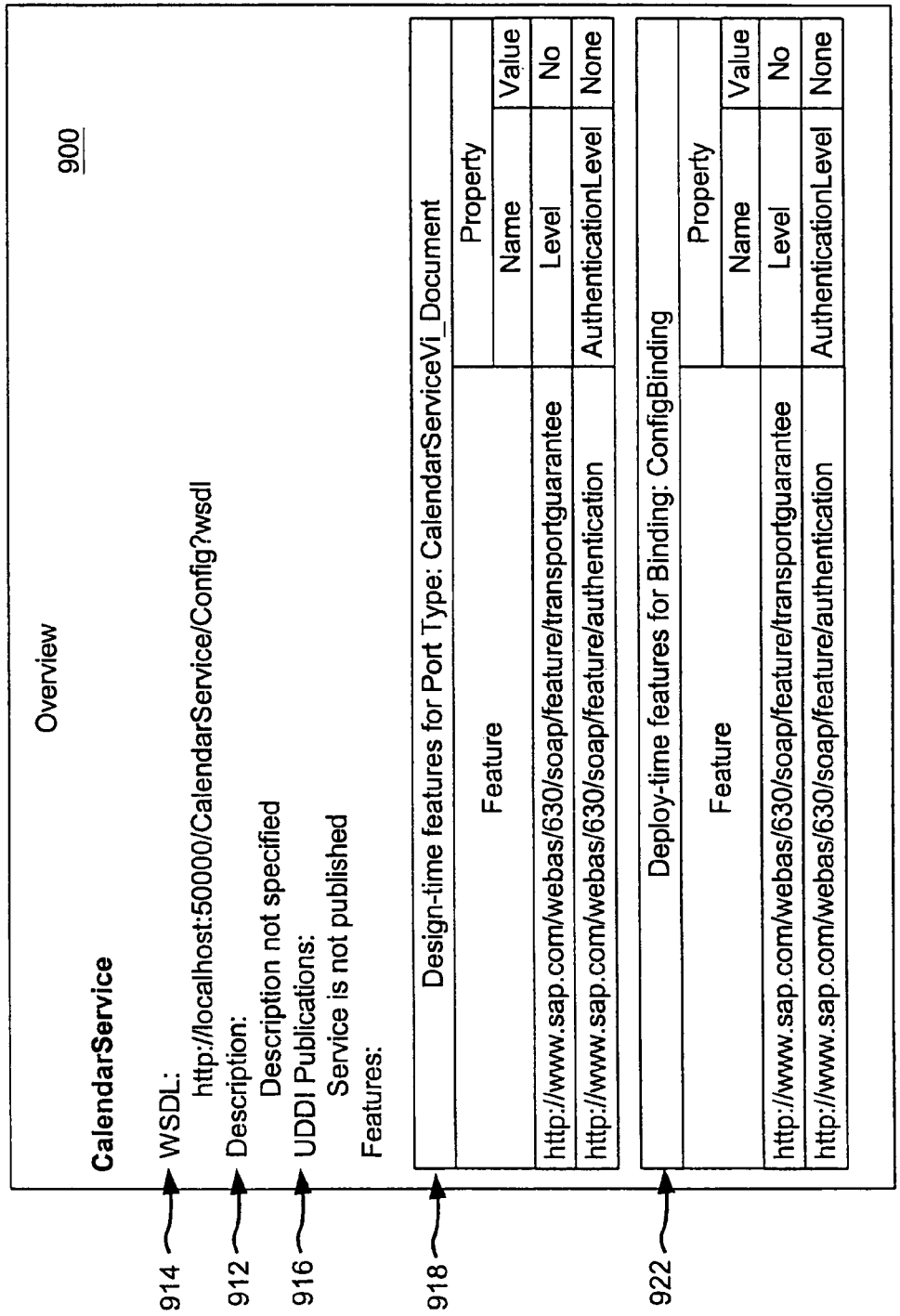
FIG. 9 is an exemplary illustration of Overview Web page 900.

FIG. 9 is an exemplary illustration of Overview Web page 900. Overview Web page 900 may provide general information about a corresponding Web service such as a description of the Web service 912. In an embodiment, overview Web page 900 includes WSDL document link 914. WSDL document link 914 provides a link to a WSDL document that describes the corresponding Web service. In an embodiment, overview Web page 900 may also include list of UDDI publications 916. List of UDDI publications 916 may be a list of some or all of the Web service registries with which the corresponding Web service is registered.

In an embodiment, overview Web page 900 includes a list of design-time features 918 and/or a list of deploy-time features 922. List of design-time features 918 may include a list of abstract features such as level of transport guarantee and/or level of security, rather than the particular technical implementation details of the listed feature. Similarly, in an embodiment, list of deploy-time features 922 may include a list of abstract deploy-time features rather specific deploy-time implementation details. In the illustrated embodiment, each listed feature includes an associated property and, for each property, there is a property name and a property value.

Figure 10:
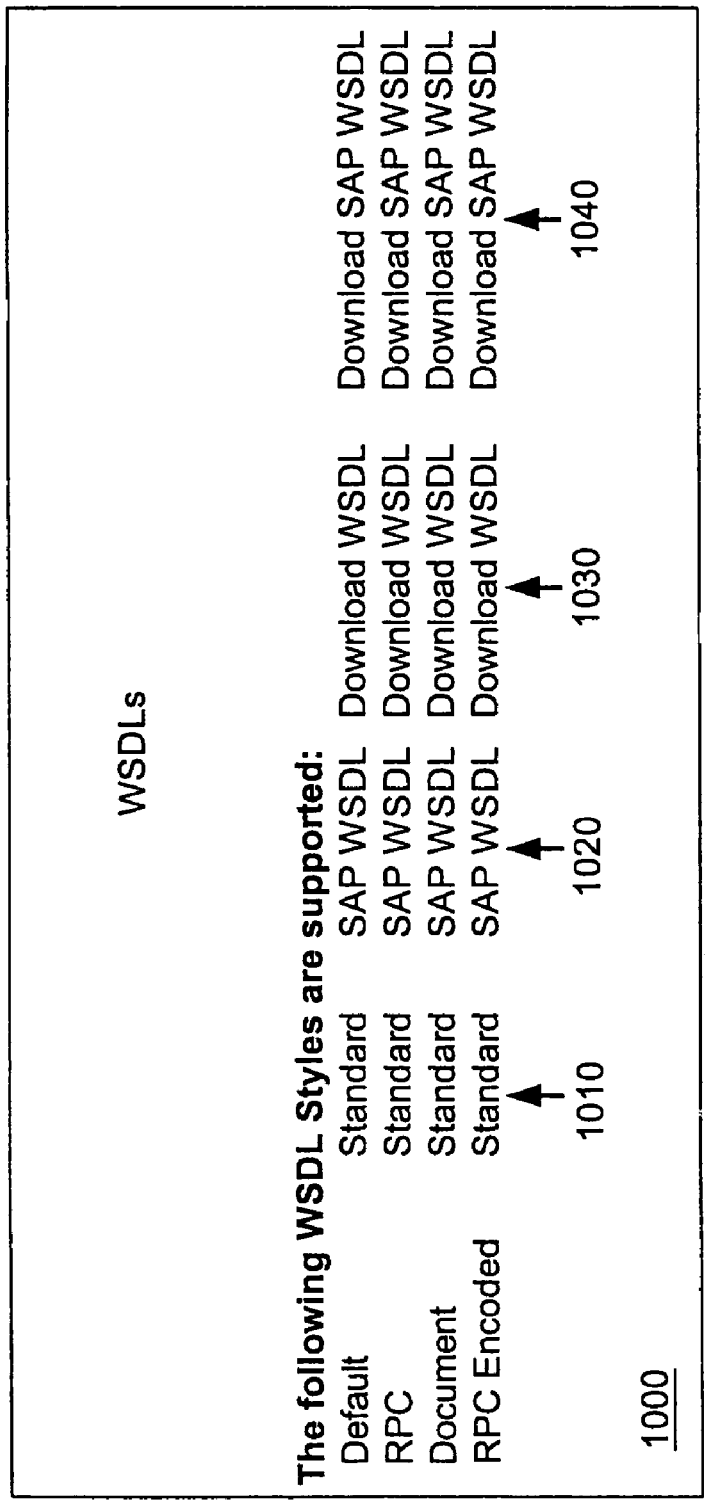
FIG. 10 illustrates WSDL Web page 1000, implemented according to an embodiment of the invention.

FIG. 10 illustrates WSDL Web page 1000, implemented according to an embodiment of the invention. The WSDL 1.1 Standard defines several ways to describe the same Web service. Each of the different ways to describe the Web service may produce a different XML representation of the requests and responses for the Web service. (In other cases, however, the various defined ways to describe the Web service may produce equivalent or substantially equivalent requests and responses for the Web service). The term WSDL "style" refers to the different ways that are defined to describe a Web service. In an embodiment, WSDL Web page 1000 provides one or more links to one or more supported "styles" of WSDL documents. The illustrated embodiment of WSDL Web page 1000 supports three of the most commonly used styles of WSDL documents. Thus, regardless of the WSDL style supported by a Web service consumer, the Web service consumer is likely able to generate a client based on at least one of the WSDL styles available on WSDL Web page 1000. For each supported WSDL style, WSDL Web page 1000 may include standard WSDL link 1010 and proprietary WSDL link 1020. Standard WSDL link 1010 is a link that points to a WSDL document that is compliant with the WSDL Standard. In contrast, WSDL link 1020 points to a WSDL document that includes additional proprietary features that are not supported by the WSDL Standard. In an embodiment, WSDL Web page 1000 may include download links 1030 and 1040 to simplify the process of downloading a standard WSDL document and/or a proprietary WSDL document.

Figure 11:
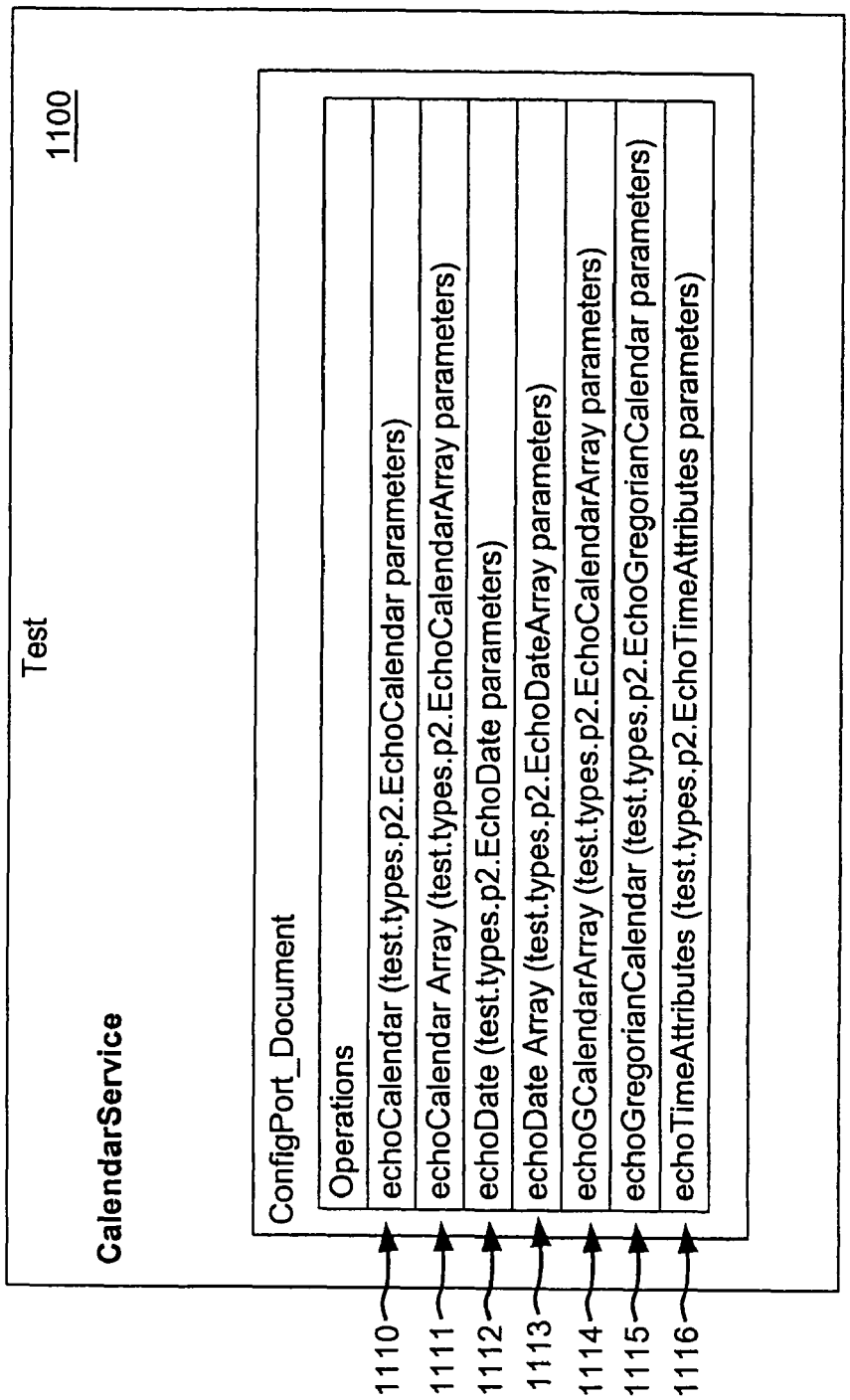
FIG. 11 illustrates test Web page 1100, implemented according to an embodiment of the invention.

FIG. 11 illustrates test Web page 1100, implemented according to an embodiment of the invention. Test Web page 1100 provides one or more tests, to test the operations of an associated Web service. In an embodiment, the one or more tests are browser-based tests. The term "browser-based" test refers to a test that is conducted via a Web browser without the need to download and/or configure additional testing code. An example of a browser-based test includes sending a client request for Web services through the Web browser and displaying the corresponding response in the Web browser.

In an embodiment, test Web page 1100 supports sessions to provide statefull communication. The term "session" refers to an active connection between two nodes. The term "statefull communication" refers to keeping track of, for example, configuration settings and/or transaction information during a session. In an embodiment, test Web page 1100 also supports testing/accessing a secured Web service (e.g., with authentication).

Figure 12:
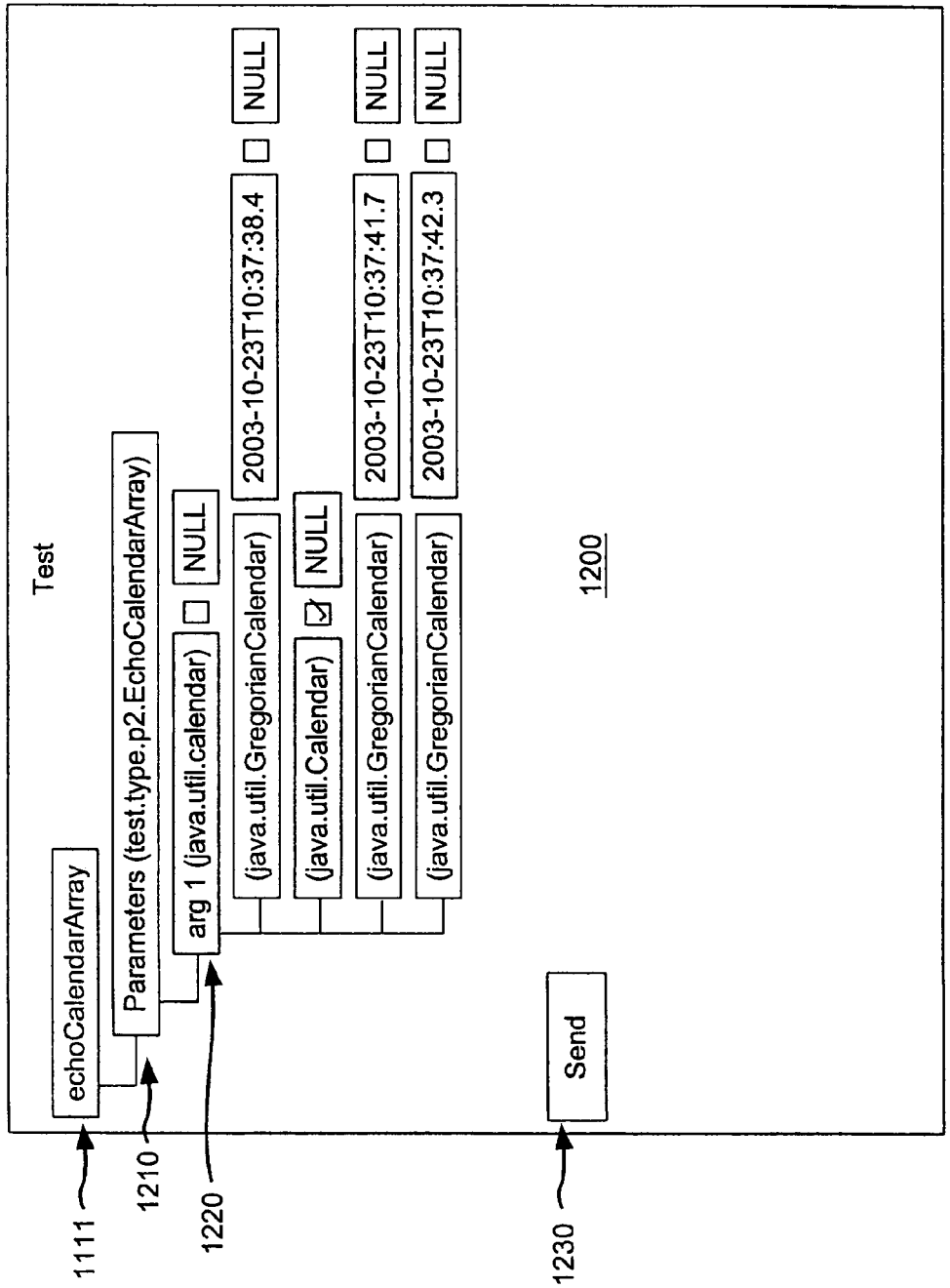
FIG. 12 illustrates an exemplary result if operation 1111 is selected.

The illustrated embodiment of test Web page 1100 includes operations 1110-1116. Operations 1110-1116 include some or all of the operations provided by an associated Web service. In an embodiment, if a user selects one of operations 1110-1116, a tree representation of the parameters of the selected operation is displayed. For example, FIG. 12 illustrates an exemplary result if operation 1111 is selected. In the illustrated embodiment, operation 1111 includes parameter 1210. Parameter 1210, in turn, includes argument 1220. In an embodiment, a user may select one of the choices under argument 1220 as the input for a test of operation 1111. After selecting one of the input choices, the user may then send the selected input as a request to the Web service by pressing send button 1230.

Figure 13A:
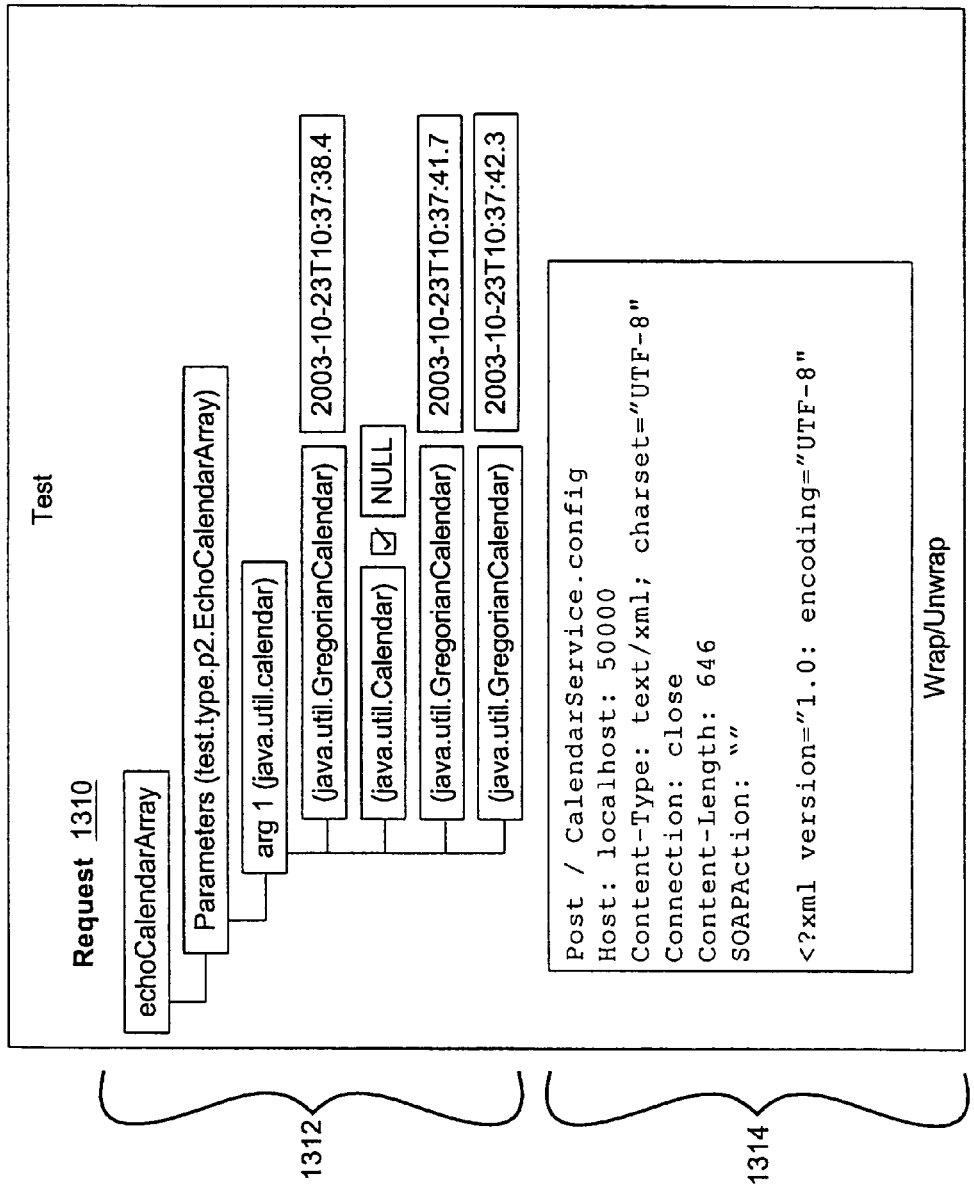
FIG. 13A illustrates displayed request 1310.
Figure 13B:
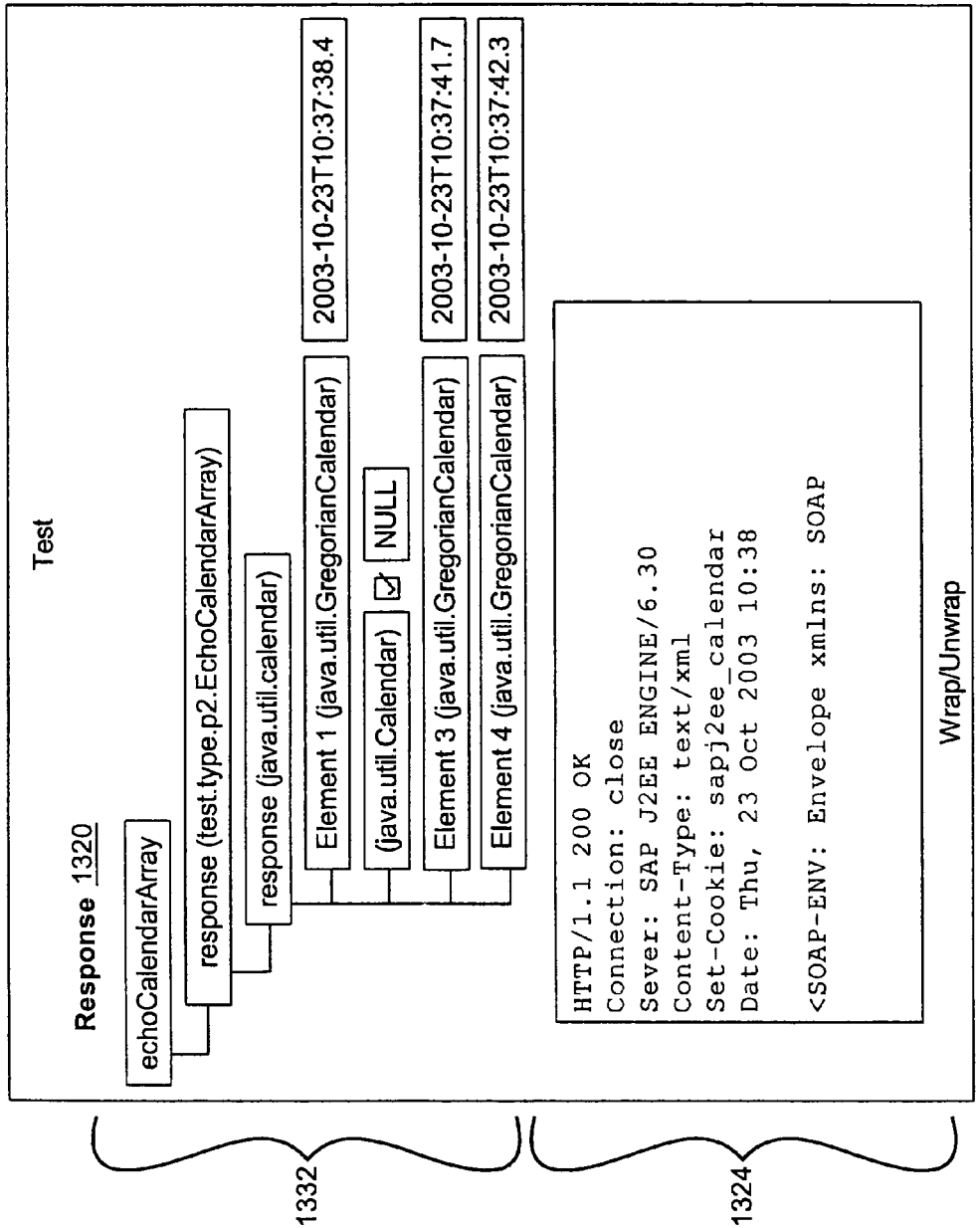
FIG. 13B illustrates displayed response 1320.

In an embodiment, test Web page 1100 displays the request that is sent to the Web service and a corresponding response, after the request is sent (e.g., by pressing send button 1230). FIG. 13A illustrates displayed request 1310 and FIG. 13B illustrates displayed response 1320. In the illustrated embodiment, displayed request 1310 includes a tree representation of the request 1312 and a plain text representation of the request 1314. Similarly, displayed response 1320 includes a tree representation of the response 1322 and a plain text representation of the response 1324. Displayed request 1310 and displayed response 1320 allow a computing device to test, without downloading additional software, a Web service by inspecting an input to the Web service (e.g., displayed request 1310 and a corresponding output (e.g., displayed response 1320). In an alternative embodiment, only one of a tree representation (e.g., tree representation 1312) and a plain text representation (e.g., plain text representation 1324) of the request and/or response are displayed.

In an embodiment, testing a Web service includes generating a Web service client based on, for example, a WSDL document. In such an embodiment, generating a client includes generating one or more classes (e.g., an SI class and/or an SEI class). The generated classes may be used to provide a common user interface for building a test request and sending it to, for example, a server. In an embodiment in which testing the Web service includes generating a client, both the client-side and the server-side of the Web service may be tested because the generated client may be used to generate the request and/or to parse the response. An additional advantage to such an embodiment is that the test request and/or test response use the same protocols and/or transports that an actual request and/or response would use.

Turning now to FIGS. 14-32, the particular methods associated with embodiments of the invention are described in terms of computer software and hardware with reference to a flowchart. The methods to be performed by a computing device (e.g., an application server) may constitute state machines or computer programs made up of computer-executable instructions. Describing the methods by reference to a flowchart enables one of ordinary skill in the art to develop such programs including such instructions to carry out the methods on suitably configured computing devices (e.g., one or more processors of a node) executing the instructions from computer-accessible media. The computer-executable instructions may be written in a computer programming language or may be embodied in firmware logic. If written in a programming language conforming to a recognized standard, such instructions can be executed on a variety of hardware platforms and for interface to a variety of operating systems. In addition, embodiments of the invention are not described with reference to any particular programming language. It will be appreciated that a variety of programming languages may be used to implement the teachings of the invention as described herein. Furthermore, it is common in the art to speak of software, in one form or another (e.g., program, procedure, process, application, etc.), as taking an action or causing a result. Such expressions are merely a shorthand way of saying that execution of the software by a computing device causes the device to perform an action or produce a result.

Figure 14:
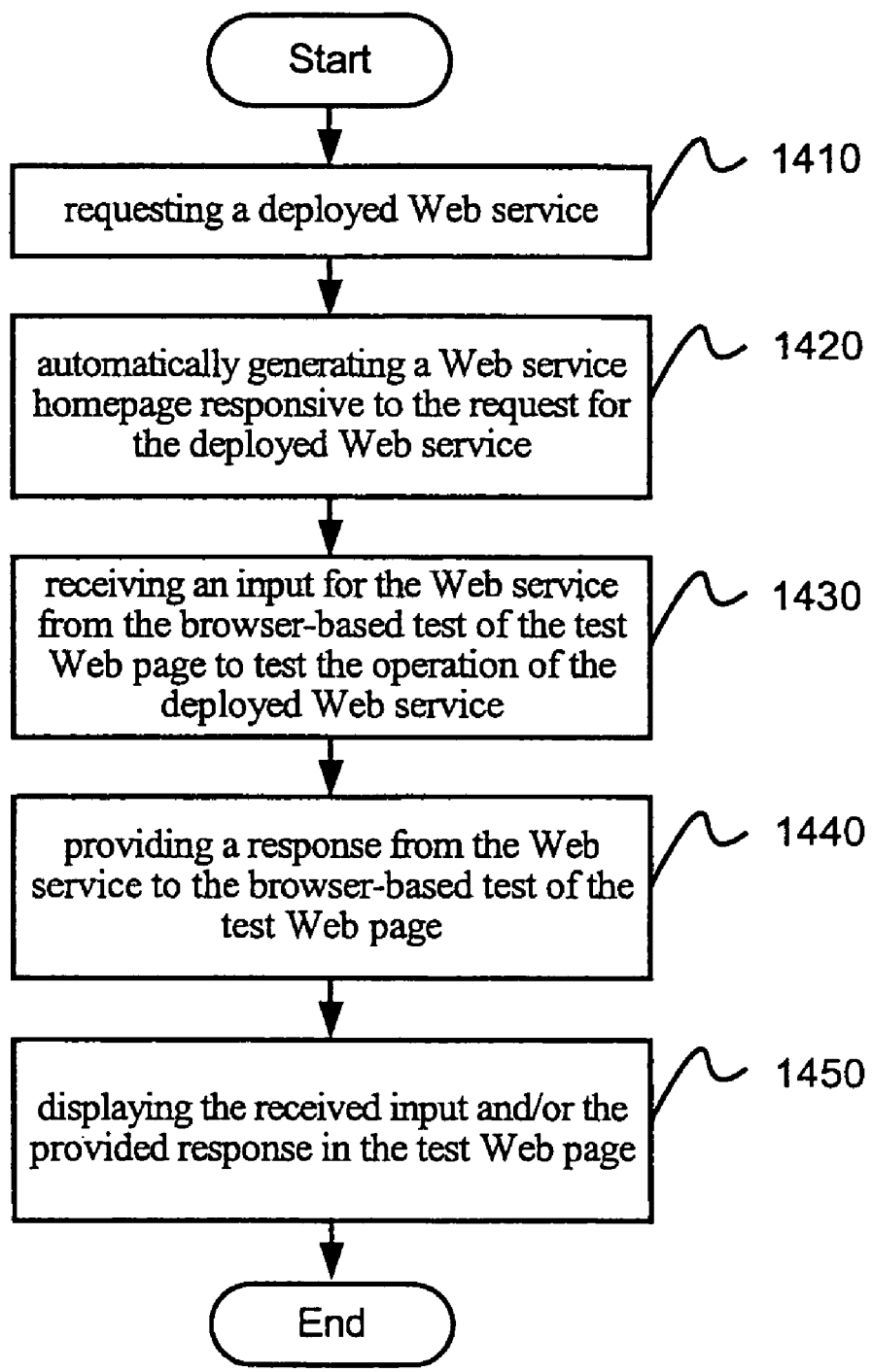
FIG. 14 is a flow diagram illustrating certain aspects of a method for testing a Web service from a Web service homepage, according to an embodiment of the invention.

FIG. 14 is a flow diagram illustrating certain aspects of a method for testing a Web service from a Web service homepage, according to an embodiment of the invention. Referring to process block 1410, a deployed Web service is requested. The term "deploy" refers to unpacking a Web service archive and placing the unpacked files (along with some generated runtime data) in, for example, a directory of an application server. Deploying a Web service is further described below with reference to FIG. 29. The term "requesting a Web service" refers to, for example, receiving, requesting, and/or passing a URL of a WSDL document that describes a Web service. In an alternative embodiment, process block 1410 may be directed to, for example, registering the Web service with a service directory (e.g., a UDDI directory).

Referring to process block 1420, a Web service homepage corresponding to the Web service is automatically generated. A Web service homepage refers to a homepage for the deployed Web service that provides, e.g., general information about the Web service and/or a browser-based testing tool(s) to test the Web service. In an embodiment, a development environment (e.g., development environment 218, shown in FIG. 2) automatically generates the Web service homepage.

In an embodiment, a separate Web service homepage is generated for each deployed Web service. In an alternative embodiment, the Web service homepage is automatically generated in response to an event other than the deployment of the Web service. For example, the Web service homepage may be automatically generated in response to developing the Web service, archiving the Web service, accessing the Web service from a registry, etc. In an embodiment, the Web service homepage includes an overview page, a Web Services Description Language (WSDL) page, and/or a test Web page. In an embodiment, the test Web page provides one or more browser-based tests to test an operation(s) of the Web page.

Referring to process block 1430, an input for the Web service is received from a browser-based test of the test Web page. The received input may be, for example, a request for a service provided by the Web service being tested. A response to the received input is provided to the browser-based test from the Web service at 1440.

Referring to process block 1450, the received input and/or the provided response is displayed on the test Web page. In an embodiment, the received input and/or provided response are displayed in a tree structure (e.g., tree structure representation 1312, shown in FIG. 13A). The received input and/or provided response may be displayed as plain text (e.g., plain text representation 1324, shown in FIG. 13B). In an embodiment, the received input and/or provided response are displayed in both a tree structure and in plain text.

Figure 15:
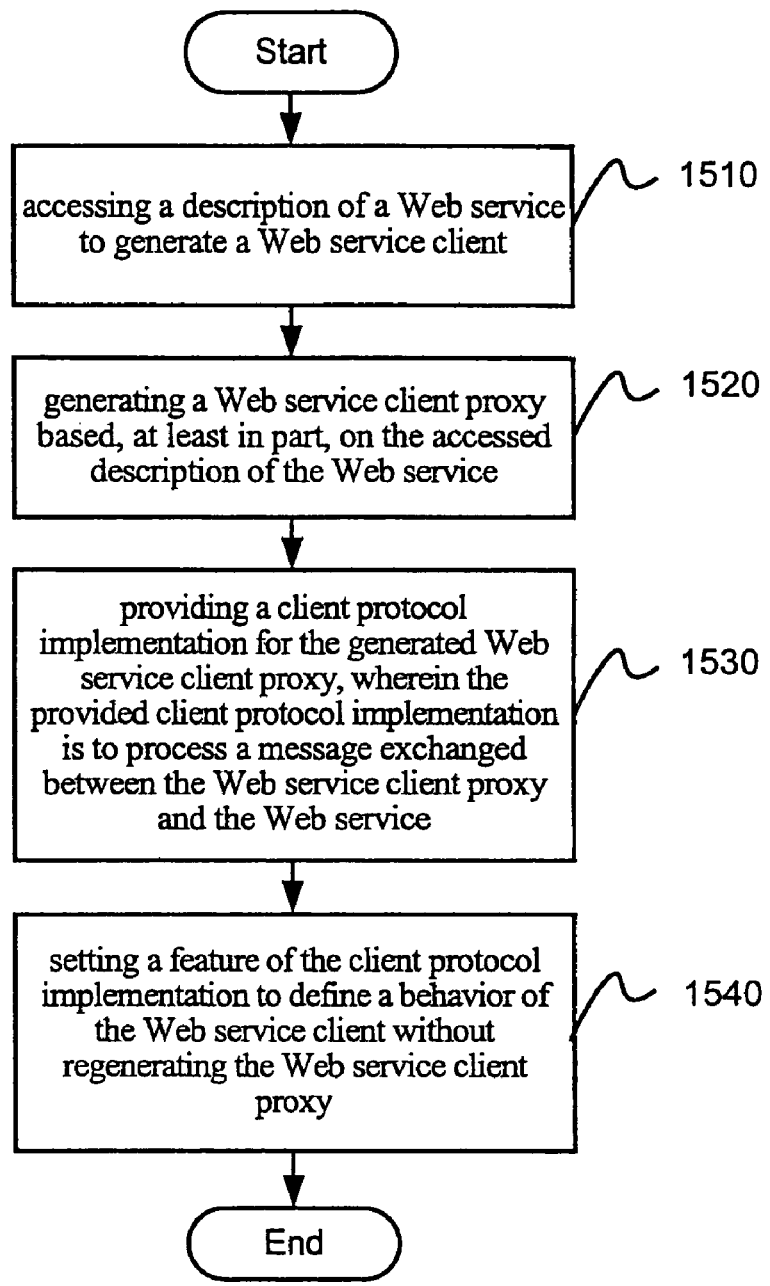
FIG. 15 is a flow diagram illustrating certain aspects of extending a Web service client with a client protocol implementation, according to an embodiment of the invention.

FIG. 15 is a flow diagram illustrating certain aspects of extending a Web service client with a client protocol implementation, according to an embodiment of the invention. Referring to process block 1510, a description of a Web service is accessed in order to generate a Web service client. In an embodiment, the accessed description is a WSDL document describing the Web service. The WSDL document may be accessed from, for example, a UDDI directory of published Web services.

Referring to process block 1520, a Web service client proxy is generated based, at least in part, on the accessed description of the Web service. In an embodiment, the generated Web service client proxy may be either a deployable proxy or a standalone proxy. The term "deployable proxy" refers to a Web service client proxy that is to be deployed on a J2EE application server. The term "J2EE application server" refers to an application server that, at least partly, implements one of the J2EE standards. The term "standalone proxy" refers to a Web service client proxy that generates stubs and runs without the services available on a J2EE application server.

Referring to process block 1530, a client protocol implementation is provided for the generated proxy. The purpose of the client protocol implementation is to implement additional functionality in replaceable units. Since the client protocol implementations are separate from the generated proxy they may function independently of the generated proxy at runtime. In an embodiment, the client protocol implementation is defined in the accessed Web service description. For example, the client protocol implementation may be described in a WSDL attachment.

Figure 16:
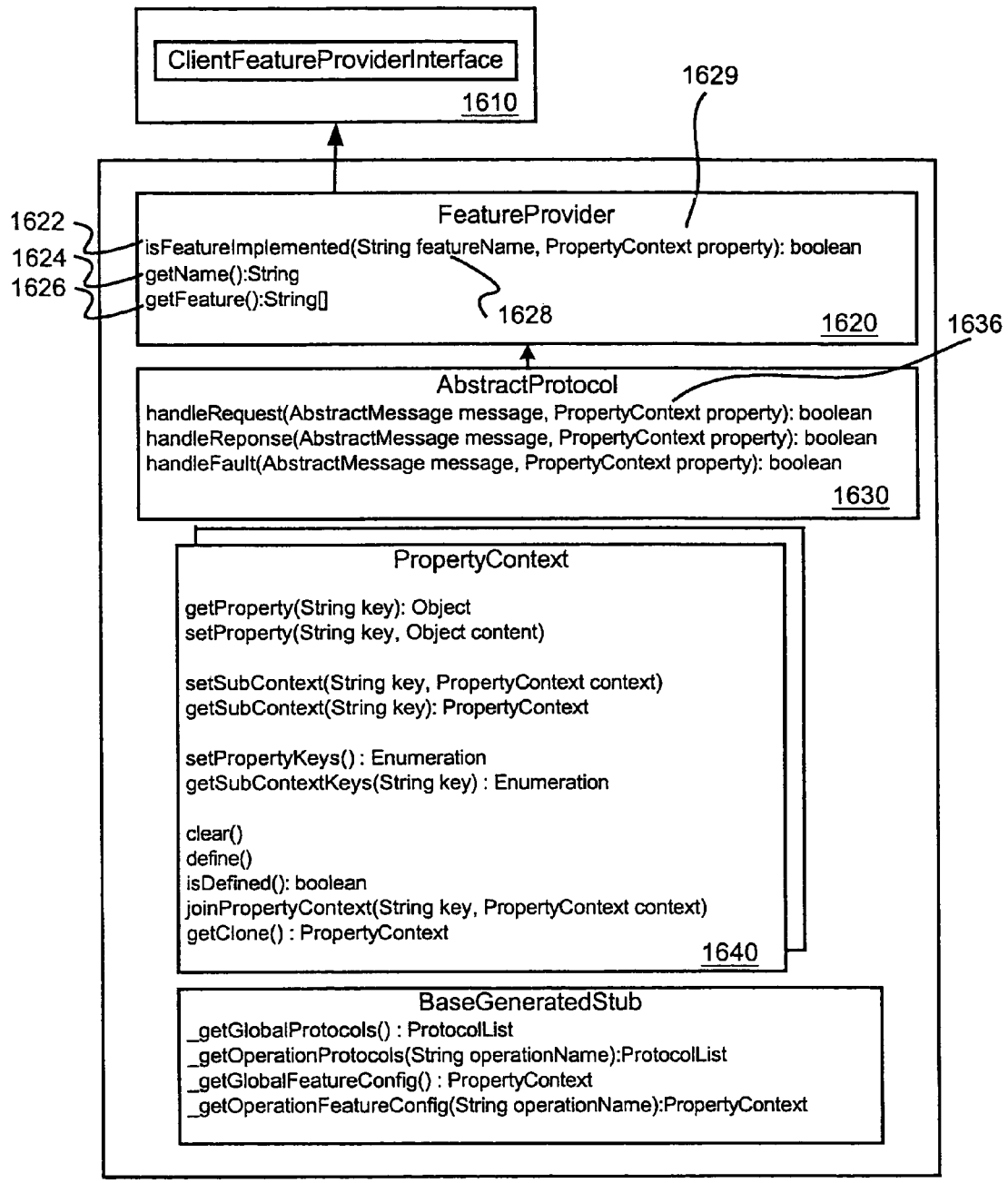
FIG. 16 illustrates selected interfaces of an exemplary client protocol implementation, according to an embodiment of the invention.

A client protocol implementation may be described in terms of one or more interfaces. FIG. 16 illustrates selected interfaces of an exemplary client protocol implementation, according to an embodiment of the invention. The illustrated interfaces incorporate the term "feature" because a client protocol implementation adds features (or functionalities) to a Web service client. In an embodiment, the interfaces of the client protocol implementation may include: clientFeatureProviderInterface 1610, FeatureProvider interface 1620, and AbstractProtocol interface 1630.

In an embodiment, the client protocol implementation accesses FeatureProvider interface 1620 through clientFeatureProviderInterface 1610. FeatureProvider interface 1620, in turn, provides access to a number of functions that are specified in underlying AbstractProtocol interface 1630 and PropertyContext 1640. In the illustrated embodiment, FeatureProvider interface 1620 accesses the underlying functions with the following methods: is FeatureImplemented( )1622, getName( )1624, and getFeature( )1626. In an embodiment, is FeatureImplemented( ) method 1622 is used to determine whether a function is provided by a particular client protocol implementation. Method 1622 may return the value "true" if the feature named in parameter 1628 and the properties specified in parameter 1629 are provided by the protocol implementation. Method 1624 may be invoked to obtain the name of the protocol implementation. In an embodiment, method 1626 may be invoked to obtain a string array of features supported by the client protocol implementation.

In an embodiment, the client protocol implementation is described by AbstractProtocol interface 1630. AbstractProtocol interface 1630 "describes" the client protocol implementation by providing one or more method calls to the underlying PropertyContext interface(s) (e.g., PropertyContext interface 1640) that provide the functions of the client protocol implementations. Calls to the underlying functions may be made with, for example, PropertyContext property parameter 1636. In an embodiment, PropertyContext interface 1640 receives the call and returns a response to implement the function defined by PropertyContext interface 1640.

In an embodiment, PropertyContext interface 1640 describes one or more functions provided by the client protocol implementation. In an embodiment, PropertyContext interface 1640 provides a number of methods that may be used to describe and store information about the function. Table 1 provides an overview of the methods available in the illustrated embodiment of PropertyContext interface 1640.

TABLE 1

| Property | Description |
|---|---|
| Object getProperty(String key) | This method obtains a subcontext. |
| void setSubContext(String key, PropertyContext context) | The method sets a subcontext. |
| void setProperty(String key, Object content) | The method sets a property. |
| void clear( ) | This method clears a property context. |
| PropertyContext getSubContext(String key) | This method returns a sub-property. |
| Enumeration getPropertyKeys( )- | This method returns property keys. |
| Enumeration getSubcontextKeys( ) | This method returns a sub-property context. |
| PropertyContext getClone( ) | This method returns a clone of a specified property context. |

In an embodiment, the client protocol implementation is implemented as a Java service. The term "Java service" broadly refers to a service developed according to the Java programming language.

In an embodiment, the client protocol implementation is an implementation of a security protocol. For example, the client protocol implementation may be an authentication protocol implementation. Table 2 illustrates three exemplary authentication options that are available in an embodiment of the invention. In an embodiment, the authentication protocol implementation is logic that implements one or more of the authentication types shown in Table 2. In an alternative embodiment, the authentication protocol implementation is an implementation of a different authentication type.

TABLE 2

| Authentication Type | Exemplary Supporting Specifications |
|---|---|
| HTTP with user name and password | Any of the HyperText Transfer Protocols (HTTPs) including, for example, the protocol described in Request For Comments (RFC) 2616 entitled, "HyperText Transport Protocol - HTTP/1.1," June 1999 (hereinafter, the HTTP Protocol). |
| HTTP secured through the Secure Socket Layer | Any of the HTTP protocols and any of the Secure Socket Layer protocols including, for example, the protocol entitled, "The SSL Protocol Ver. 3.0," Nov. 18, 1996. |
| X.509 Client Certificates using HTTP secured through SSL | Any of the HTTP and SSL protocols and, for example, the standard specified in the International Telecommunication Union - Telecommunication Standardization Sector (ITU-T) Recommendation X.509 (August 1997) Authentication Framework. |

In an embodiment, the client protocol implementation is an implementation of a wrapper protocol. The term "wrapper protocol" broadly refers to a protocol for adding a header, and/or footer, and/or wrapper to a message. For example, in an embodiment, a SOAP header protocol is used to add a SOAP header to a message. A "SOAP header" broadly refers to a message header that is implemented according to any of the SOAP protocols. Table 3 illustrates three exemplary methods that a SOAP header protocol implementation provides in an embodiment of the invention. In an alternative embodiment of the invention, a different wrapper protocol may be implemented and different or additional methods may be available.

TABLE 3

| Method | Description |
|---|---|
| Headers.setOutputHeader (new Name ("urn:myuri.com", "myHeader"), value) | This method enables a schema-derived element type to be passed. In an embodiment, a schema-derived element type is declared as follows: <xs: element name="myHeader" namespace="urn:myuri.com" type="tns:myType"/>. |
| Headers.getInputHeader (headerName: Qname): Element | This method returns a Document Object Model element with the header content response. |
| Headers.getInputHeader (headerName: QName, headerClass: Class): Obj | This method deserializes a schema-declared header. |

In an embodiment, the client protocol implementation is an implementation of a session protocol. A session protocol provides methods for restarting sessions and releasing session resources on a node. Table 4 illustrates two exemplary methods provided by a session protocol implementation in an embodiment of the invention. In an alternative embodiment, a session protocol implementation may provide different and/or additional methods.

TABLE 4

| Method | Description |
|---|---|
| Session.closeSession( ) : void | This method closes the current session. |
| Session.isMaintainSession( ) : boolean | This method provides information about the current session state. |

Referring again to FIG. 15, a feature of the client protocol implementation is set to define a behavior of the Web service client without regenerating the client proxy at 1540. In an embodiment, features of a client protocol implementation may be set via a graphical user interface. For example, a user may select an icon representing an authentication protocol implementation. The user may then select from a number of authentication types using, for example, a pointing device. The feature of the authentication protocol implementation may be set when, for example, the system receives an indication that the user has selected the authentication type with the pointing device. In an alternative embodiment, a feature may be set via a command line interface. In such an embodiment, setting the feature may consist of receiving an indication that the user has entered a text-base command that sets the feature.

Figure 17:
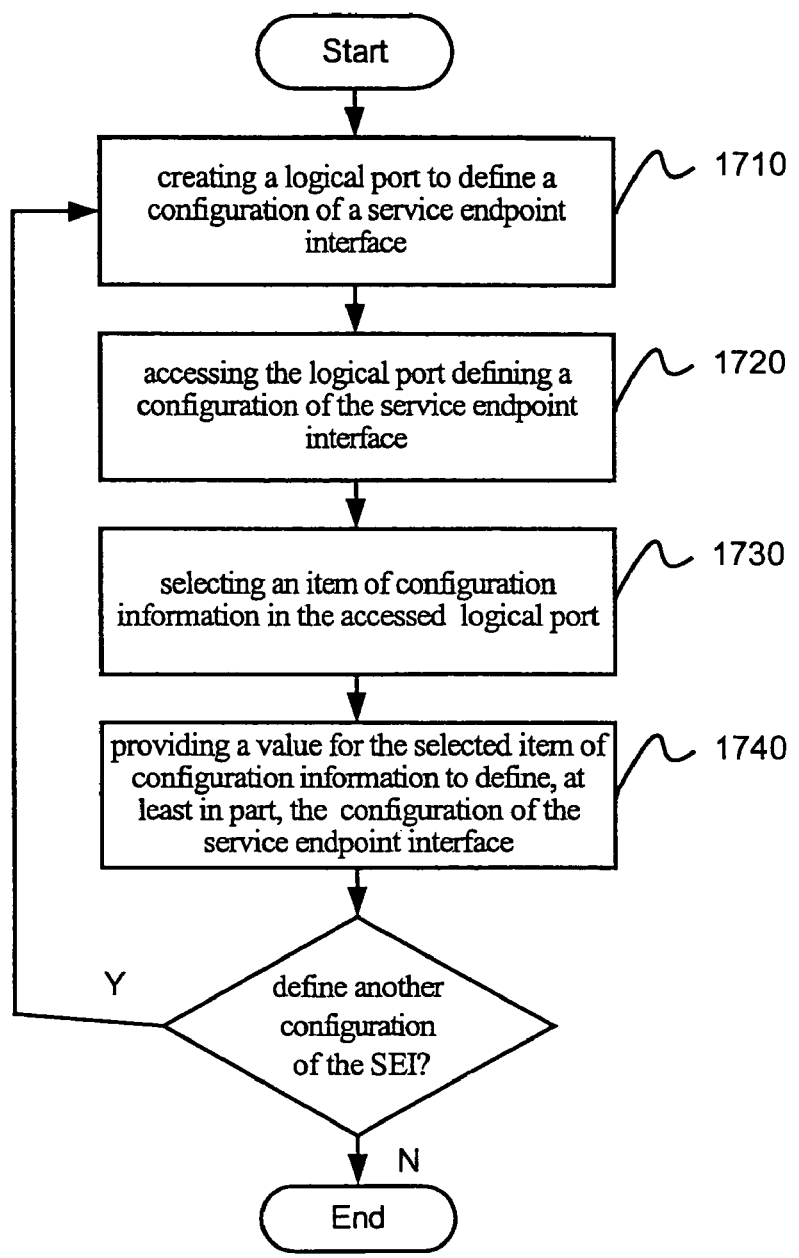
FIG. 17 is a flow diagram illustrating certain aspects of providing one or more configurations of a service endpoint interface, according to an embodiment of the invention.

FIG. 17 is a flow diagram illustrating certain aspects of providing one or more configurations of a service endpoint interface, according to an embodiment of the invention. In an embodiment, a logical port (e.g., logical port 720 and/or 730, shown in FIG. 7) provides the configuration of a particular service endpoint interface. Referring to process block 1710, a logical port is created to define a configuration of a service endpoint interface. In an embodiment, the client configuration settings correspond to the configuration settings of an associated Web service. In an embodiment, logical ports may be added and/or configured via, for example, a graphical user interface (e.g., in development environment 218 shown in FIG. 2). This may be desirable if, for example, the configuration settings of the corresponding Web service have been reconfigured.

Figure 18:
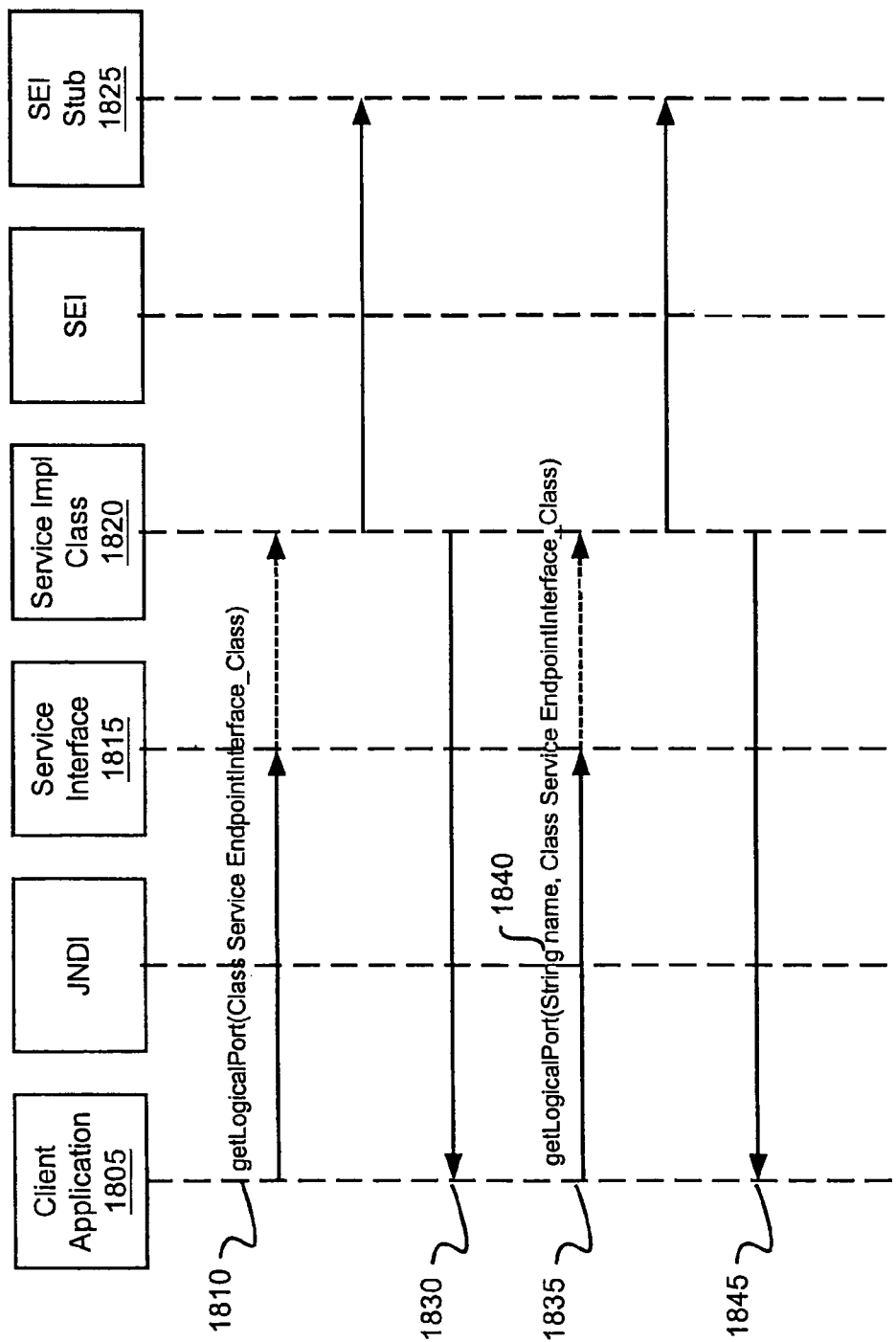
FIG. 18 illustrates obtaining a logical port according to an embodiment of the invention.

FIG. 18 illustrates obtaining a logical port according to an embodiment of the invention. In an embodiment, client application 1805 obtains a default logical port through method call 1810, which does not specify a name for the logical port. Service interface 1815 directs service implementation class 1820 to load an instance of the default logical port from stub 1825. In an embodiment (e.g., for a deployable client), the implementation of service interface 1815 is obtained from the Java Naming and Directory Interface (JNDI) service. In an alternative embodiment, (e.g., for a standalone client) the implementation of service interface 1815 is instantiated. The default logical port is returned to client application 1805 at 1830.

Referring to reference numeral 1835, client application 1805 obtains a specific (or named) logical port. In the illustrated embodiment, string name 1840 illustrates a method call that specifies the requested logical port. Service interface 1815 directs service implementation class 1820 to load an instance of the specified logical port from stub 1825. The default logical port is returned to client application 1805 at 1845.

Referring again to FIG. 17, a logical port is accessed at process block 1720. Accessing a logical port refers to, for example, accessing configuration information within a logical port. In an embodiment, a graphical user interface is used to access and configure a logical port. In an alternative embodiment, a logical port may be accessed through a command-driven interface (e.g., via a command line that accepts typed-in commands).

Referring to process block 1730, configuration information is selected in the accessed logical port. In an embodiment, the configuration information is selected by receiving an indication from a Graphical User Interface (GUI) that the configuration information has been selected. In an alternative embodiment, the configuration information is selected by, for example, receiving an indication from a command-driven interface that the configuration information has been selected.

Referring to process block 1740 a value is provided for the selected configuration information. In an embodiment, the configuration of a service endpoint interface is defined, at least in part, by the provided configuration information. In an embodiment, the configuration information may be automatically retrieved from, for example, a WSDL document (e.g., a WSDL document that corresponds to the configuration of the Web service as defined in its Web service deployment descriptor). In an embodiment, the configuration information may be received from a user through, for example, a GUI and provided to the logical port by a computing system that directly or indirectly receives the configuration information. In an embodiment, the provided configuration information may be any of the configuration information discussed above with reference to FIG. 7. In addition, the provided configuration information may include an access address for the logical port (e.g., a URL) and/or a name for the logical port.

Figure 1:
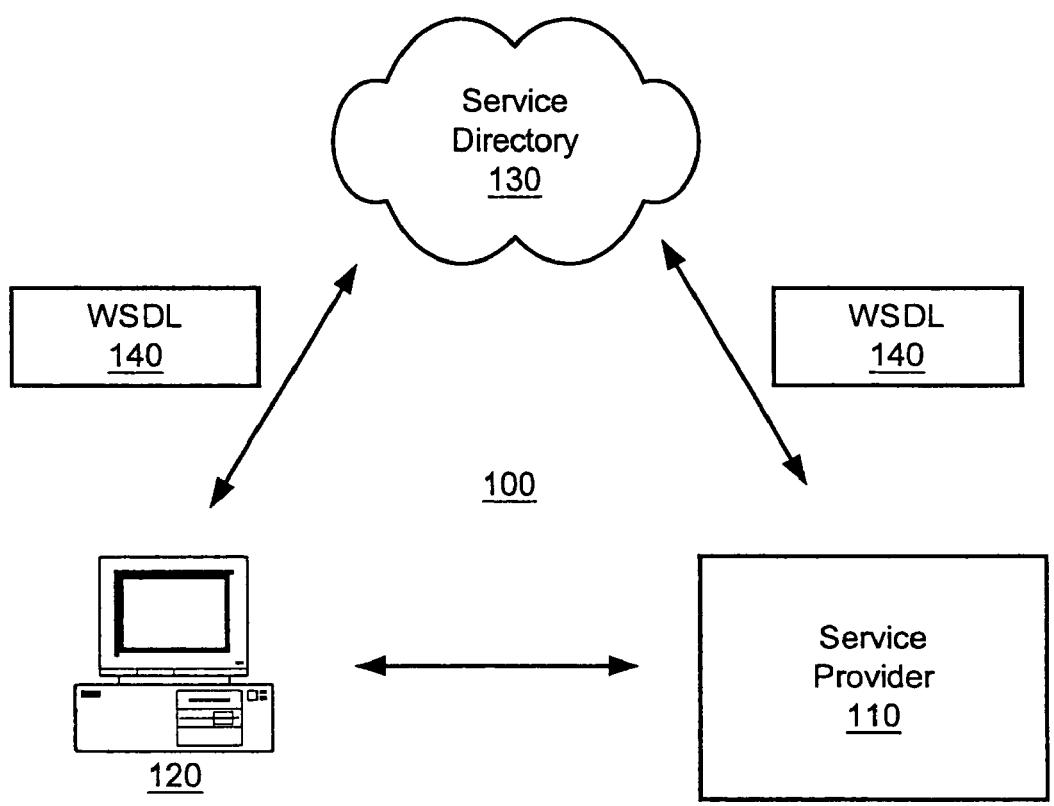
FIG. 1 is a block diagram of the basic architecture of a conventional Web service framework 100.
Figure 19:
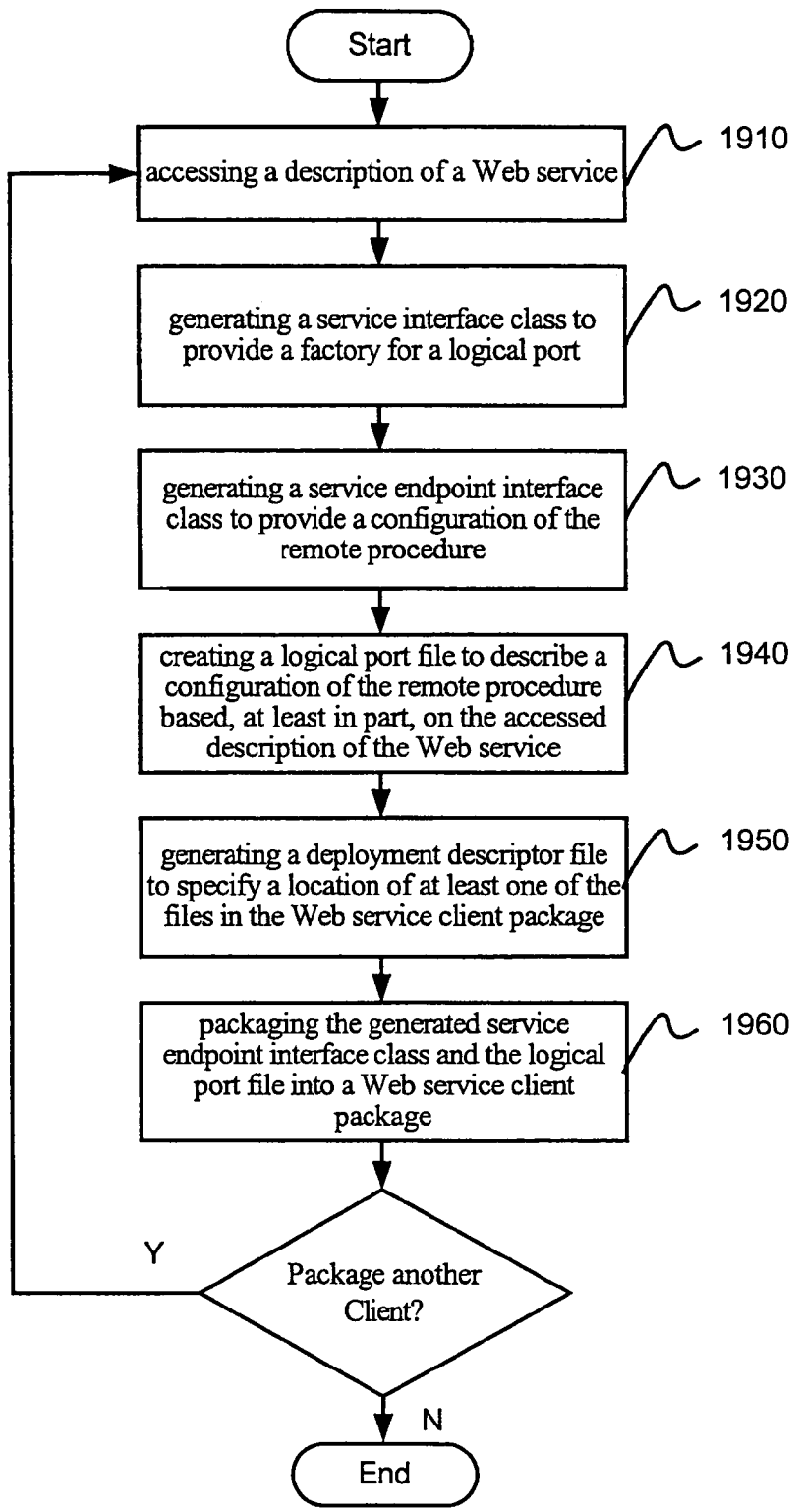
FIG. 19 is a flow diagram illustrating certain aspects of creating a Web service client package, according to an embodiment of the invention.

FIG. 19 is a flow diagram illustrating certain aspects of creating a Web service client package, according to an embodiment of the invention. The term "Web service client package" refers to a structured collection of software entities from which a Web service client may be, at least in part, generated. Referring to process block 1910, a computing device accesses a description of a Web service. The description of the Web service may be accessed either locally or over a network (e.g., via the Internet). In an embodiment, the computing device accesses the description of the Web service from a directory of Web services (e.g., service directory 130, shown in FIG. 1). In such an embodiment, the term "accessing" refers to downloading the description from the directory and/or to directly accessing the description from the remote directory. In an embodiment, the accessed Web service description is a Web Service Description Language (WSDL) document that describes the Web service.

Referring to process block 1920, the computing device generates a service interface class. In an embodiment, the service interface class is a factory for obtaining logical ports. The term "factory" refers to a software entity (e.g., a Java object) that provides instances of a particular class of software entities (e.g., a logical port). In an embodiment, the service interface class is a Java based service interface class.

FIG. 20 illustrates selected elements of an exemplary service interface class 2000 for the calendar Web service illustrated in FIGS. 9 through 13B. In an embodiment, service interface class 2000 specifies one or more services with which the class will operate at 2010. In the illustrated embodiment, service interface class 2000 operates with a Logical Port API, a Remote Method Invocation (RMI) service, and/or a Remote Procedure Call (RPC) service. In an alternative embodiment of the invention, service interface class 2000 may operate with different and/or additional services. In an embodiment, service interface class 2000 includes class members that obtain a description of a logical port (or ports) from, for example, a description of a Web service at 2020. Service interface class 2000 may also include class members 2030 to obtain an implementation of a logical port. The illustrated embodiment of service interface class 2000 also includes class member 2040 for obtaining a list of named logical ports and class member 2050 for obtaining a logical port configuration.

Referring again to FIG. 19, a service endpoint interface class is generated at process block 1930. In an embodiment, the service endpoint interface class is a client-side representation of an operation (or operations) provided by the Web service. The service endpoint interface class may be based, at least in part, on the accessed Web service description. In such an embodiment, the service endpoint interface class may also be a JAX-RPC based service endpoint interface class.

FIG. 21 illustrates selected elements of an exemplary service endpoint interface class 2100 for the calendar Web service. In an embodiment, service endpoint interface class 2100 specifies one or more Java import statements that may be used to compile the code at 2110. Class members 2120 through 2126 represent operations that are available in the calendar Web service. In an embodiment, class members 2120 through 2126 are Java based classes. In an alternative embodiment, class members 2120 through 2126 are based on a different programming language (e.g., C-sharp).

Referring again to FIG. 19, a logical port file is created at process block 1940. In an embodiment, a logical port file describes a corresponding logical port(s) (e.g., logical port 720, shown in FIG. 7). The described logical port may represent an abstraction of a service endpoint interface (and/or an underlying WSDL port). In addition, the described logical port may include configuration information for one or more Web service client protocols and/or endpoint configuration information. For example, endpoint specific information such as HTTP proxy and security information may be stored in the logical port file for each logical port. The information in the logical port file may be passed to a container (e.g., a Web services container, an Enterprise Java Bean container, etc.) when the Web service client is deployed. Since the logical port file describes the configuration of the service endpoint interface in a separate file, the configuration can be modified without regenerating the client proxy.

FIG. 22 illustrates selected elements of an exemplary logical port file 2200 for the calendar Web service. In an embodiment, logical port file 2200 is a markup language based file. The term "markup language based" refers to a software entity written, and/or encoded, and/or formatted in one of the markup languages. In the illustrated embodiment, logical port file 2200 is an Extensible Markup Language (XML) based file. The term "XML based" refers to a software entity written, and/or encoded, and/or formatted in one of the XML languages.

In an embodiment, logical port file 2200 includes logical ports element 2210. Logical ports element 2210 includes one or more logical port child element(s) 2220 (or, for ease of reference, logical port element 2220). In the illustrated embodiment, logical port element 2220 includes configuration information stored in attributes 2231-2236. The configuration information stored in attributes 2231-2236 may be used to define the configuration of a service endpoint interface (or an underlying WSDL port) and/or one or more Web service client protocols. For example, attribute 2231 defines a name for the configuration and attribute 2232 defines an address for the configuration. Similarly, attributes 2233-2236 store configuration information for a binding, stub, and/or default condition.

Referring again to FIG. 19, a deployment descriptor file is generated at process block 1950. In an embodiment, the deployment descriptor file provides descriptive information about a Web service client package such as the names and locations of one or more of the files that constitute the package. In an embodiment, the deployment descriptor file is a markup language based file (e.g., an XML based file).

FIG. 23 illustrates selected elements of exemplary deployment descriptor file 2300, implemented according to an embodiment of the invention. Root element 2310 specifies a Uniform Resource Indicator for a namespace that provides definitions for the tags used in deployment descriptor file 2300. In an embodiment, service reference element 2320 provides child elements 2331 through 2337 to provide names and locations of one or more of the files that constitute a corresponding Web service client package. For example, child element 2334 may specify the location of a WSDL document that describes the Web service. In an embodiment, child element 2335 specifies the location of a logical ports file for the Web service client. A computing device may use deployment descriptor file 2300 to locate the files needed to generate and configure a Web service client, in an embodiment of the invention.

Referring again to FIG. 19, one or more files are packaged together to form a Web service client package at process block 1960. The term "packaging" broadly refers to associating two or more software entities so that they may interoperate. Packaging may include resolving dependencies and/or providing references (e.g., pointers) so that the software entities refer to each other. In an embodiment, a development environment (e.g., development environment 218, shown in FIG. 2) is used to package the files that constitute a Web service client package.

Figure 24:
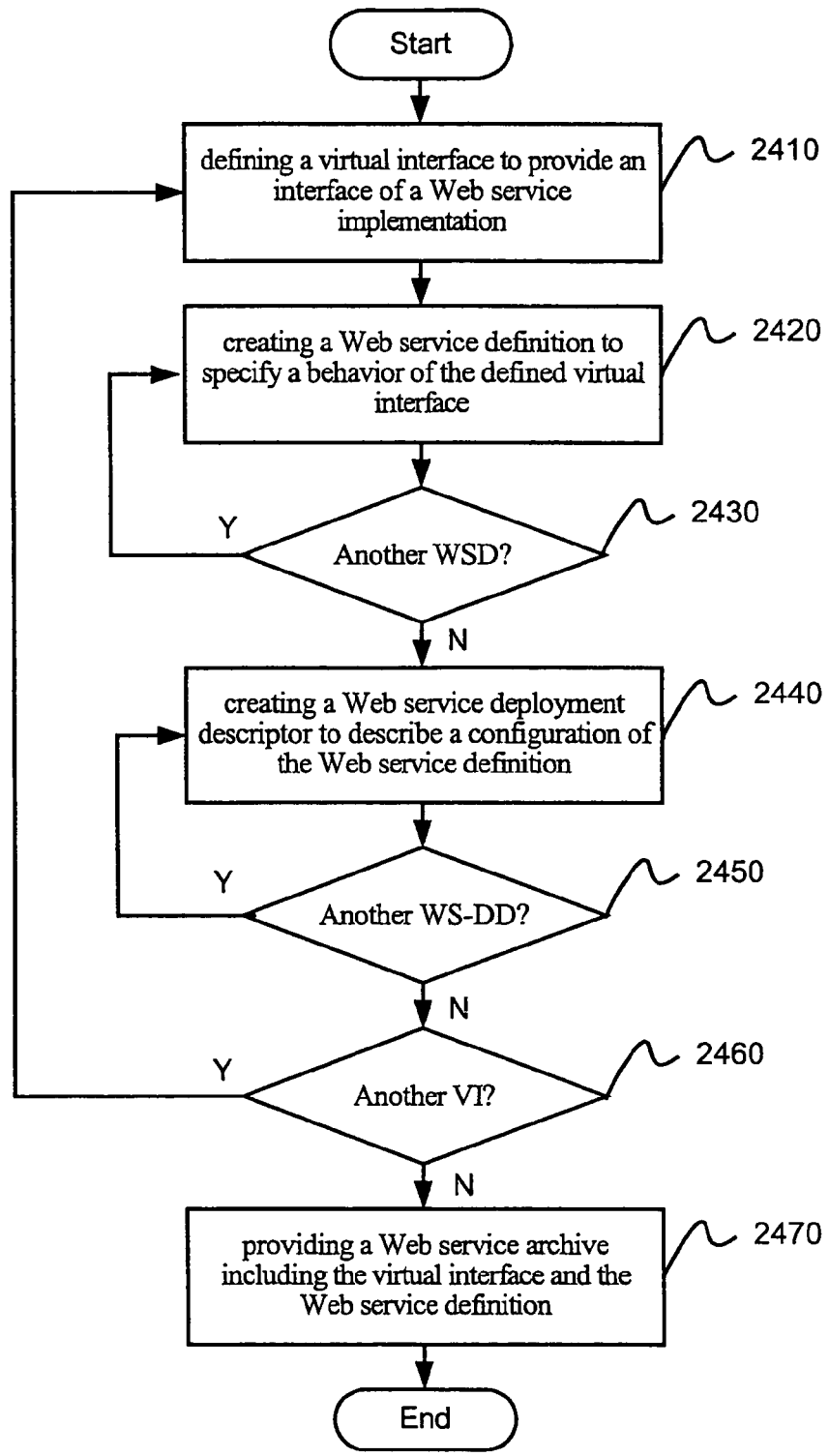
FIG. 24 is a flow diagram illustrating selected aspects of creating a Web service archive, according to an embodiment of the invention.

FIG. 24 is a flow diagram illustrating selected aspects of creating a Web service archive, according to an embodiment of the invention. The term "Web service archive" refers to a repository of software entities (e.g., modules, files, etc.) that describe, at least in part, a Web service. In an embodiment, a Web service is described in several abstract layers including: one or more virtual interfaces, one or more Web service definitions for each virtual interface, and one or more Web service deployment descriptors for each Web service definition. The one or more virtual interfaces (e.g., virtual interface 422, shown in FIG. 4) provide an abstraction over a Web service implementation (e.g., session bean 412, shown in FIG. 4) in which operations are selectively exposed. A Web service definition (e.g., Web service definition 424, shown in FIG. 4) provides a layer in which features (e.g., communication and security features) may be defined in an abstract form for each virtual interface. A Web service deployment descriptor provides a layer in which technical details (e.g., protocol implementations) for the features in the Web service definition are described. In an embodiment, a Web service archive may include a virtual interface, a Web service definition, and/or a Web service deployment descriptor.

Referring to process block 2410, in an embodiment, a computing device defines a virtual interface of a Web service implementation. In an embodiment, a virtual interface is an interface for a Web service implementation. In an embodiment, one or more virtual interfaces may be defined for the Web service implementation. Each virtual interface may be published to a service directory separately. A virtual interface may be used to, for example, hide (or expose) operations and/or parameters, change the names of operations and/or parameters, set standard (or default) values for parameters, convert parameter data types, and/or define how a parameter is represented in a SOAP message.

Figure 25A:
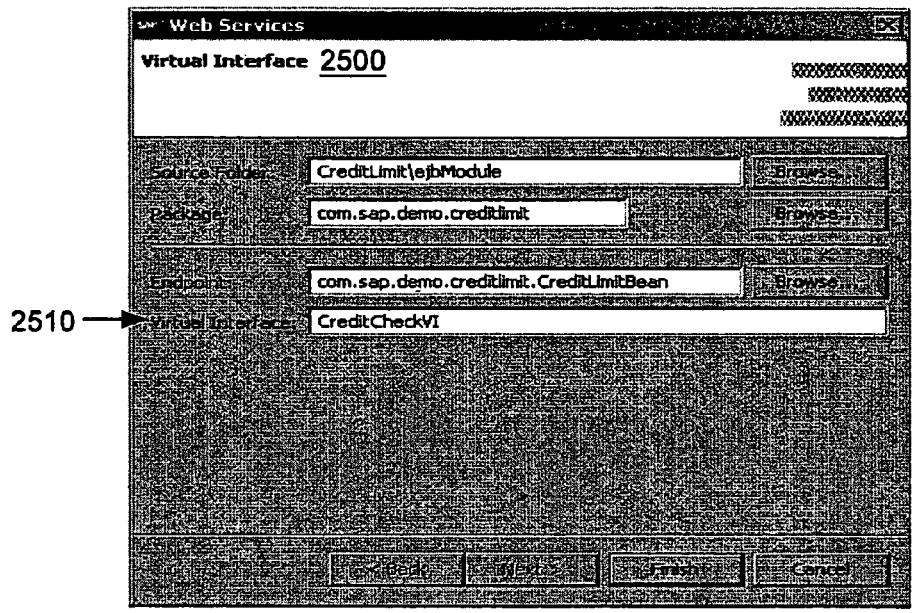
FIGS. 25A and 25B illustrate selected aspects of defining virtual interface 2500, according to an embodiment of the invention.
Figure 25B:
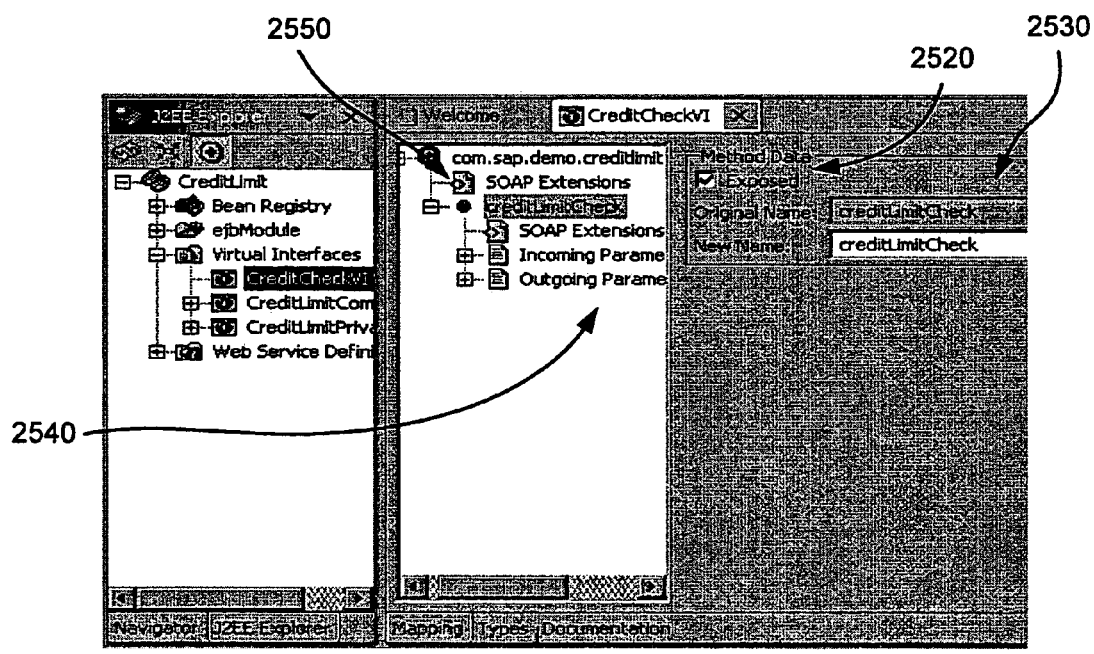

FIGS. 25A and 25B illustrate selected aspects of defining virtual interface 2500, according to an embodiment of the invention. For example, a name is provided for the virtual interface at 2510. Whether or not to expose an operation is indicated at 2520. The name of the operation may be changed at 2530. Ingoing and outgoing parameters for the operation may be selected at 2540. In an embodiment, characteristics of a parameter such as its name, data type, default value, and/or whether it is exposed may be defined. The representation of a parameter in a SOAP message (e.g., as element or attribute) and the namespace for the parameter may be defined at 2550. In an alternative embodiment, input data for virtual interface 2500 may be provided using a command-line interface.

Referring again to FIG. 24, a Web service definition is created to specify a behavior of the defined virtual interface. In an embodiment, features such as communication type or authentication level are assigned in abstract form in the Web service definition. As is further described below, the technical details to implement the features may be provided in a Web service deployment descriptor. In an embodiment, more than one Web service definition may be created for each virtual interface as shown by reference numeral 2430.

Figure 26A:
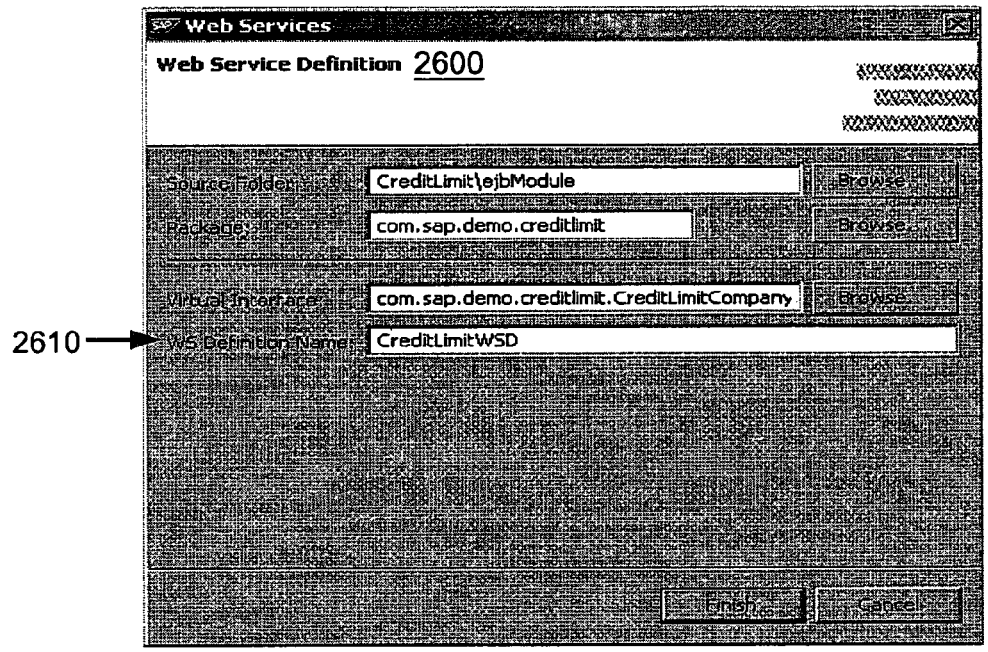
FIGS. 26A and 26B illustrate selected aspects of creating Web service definition 2600, according to an embodiment of the invention.
Figure 26B:
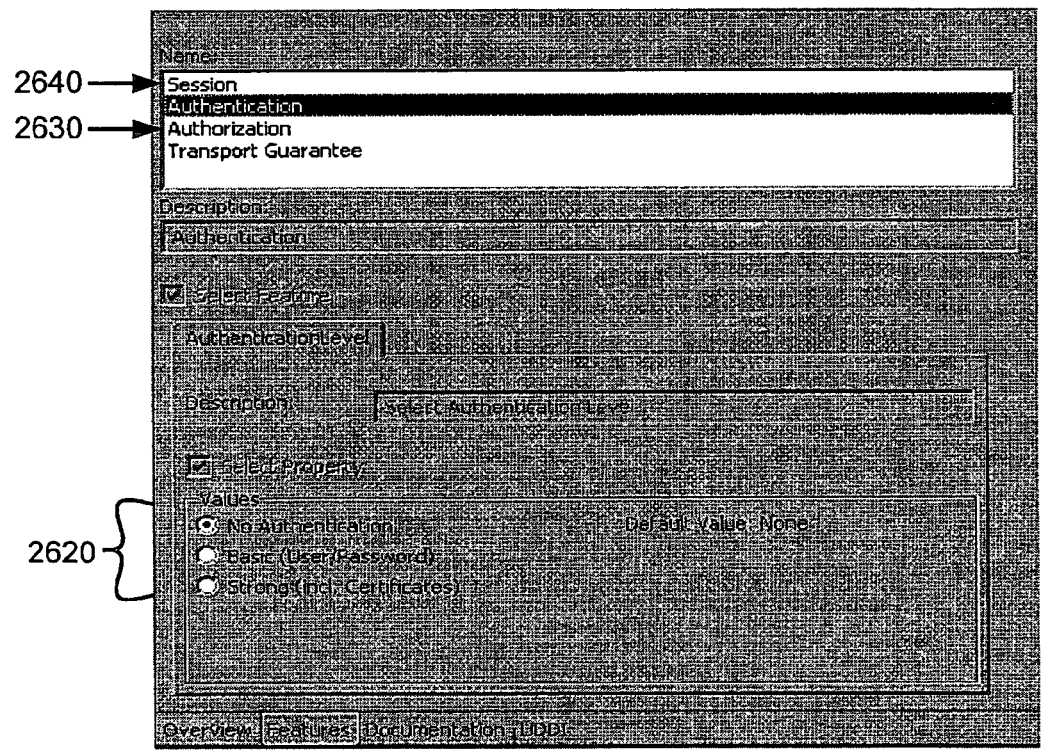

FIGS. 26A and 26B illustrate selected aspects of creating Web service definition 2600, according to an embodiment of the invention. For example a computing device provides a name for Web service definition 2600 based, at least in part, on data provided at 2610. Similarly, the computing device may specify an authentication level based on input provided at 2620. In an embodiment, three authentication levels are supported: none, basic, and strong. The basic authentication level may include the use of a user name and password. The strong authentication level may include the use of client certificates.

In an embodiment, Web service definition 2600 may specify transport guarantee features. For example, Web service definition 2600 may define whether or not data integrity and/or data confidentiality are to be supported for the associated virtual interface. In an embodiment, whether operation calls are to be protected using security roles may be defined at 2630. Similarly, whether or not communication is stateful may be defined at 2640. In an alternative embodiment, input data for Web service definition 2600 may be provided using a command-line interface.

Referring again to FIG. 24, a Web service deployment descriptor is created at 2440. In an embodiment, the Web service deployment descriptor specifies the technical implementations of the features that are described in the Web service definition. In an embodiment, one or more deployment descriptors may be created for each Web service definition as shown by reference numeral 2450. Similarly, reference numeral 2460 illustrates that one or more virtual interfaces may be defined for a Web service implementation.

Figure 27:
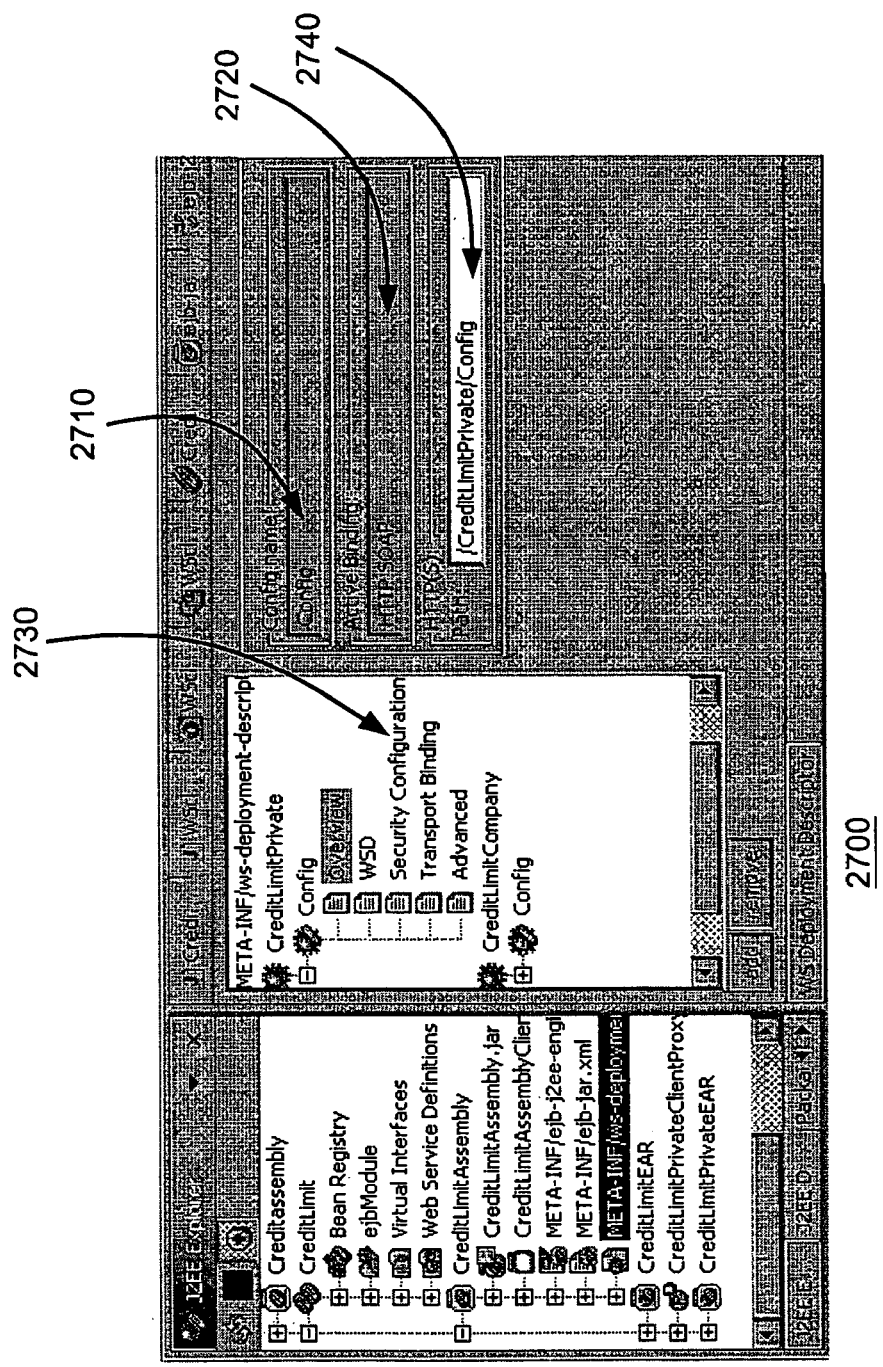
FIG. 27 illustrates selected aspects of a graphical illustration of Web service deployment descriptor 2700.

FIG. 27 illustrates selected aspects of a graphical illustration of Web service deployment descriptor 2700. In an embodiment, Web service deployment descriptor 2700 is named to distinguish it from other Web service deployment descriptors as shown by 2710. In an embodiment, a computing device may automatically provide name 2710 and/or a user may provide name 2710. A transport binding for Web service deployment descriptor 2700 is specified at 2720. In an embodiment, transport binding 2720 may include, for example, HTTP, FTP, SMTP, SOAP over HTTP, SOAP over FTP, SOAP over SMTP, and the like. In an embodiment, an authentication protocol is specified for deployment descriptor 2700 at 2730. An address for the deployment descriptor is shown at reference numeral 2740. In an embodiment, address 2740 may be a Uniform Resource Indictor.

Referring again to FIG. 24, a Web service archive is provided at 2470. In an embodiment, providing a Web service archive refers to creating an archive file that includes a virtual interface, a Web service definition, and/or a Web service deployment descriptor. In an embodiment, the Web service archive is an Enterprise Archive (EAR). An EAR broadly refers to a software entity suitable for deployment on a J2EE application server.

Figure 28:
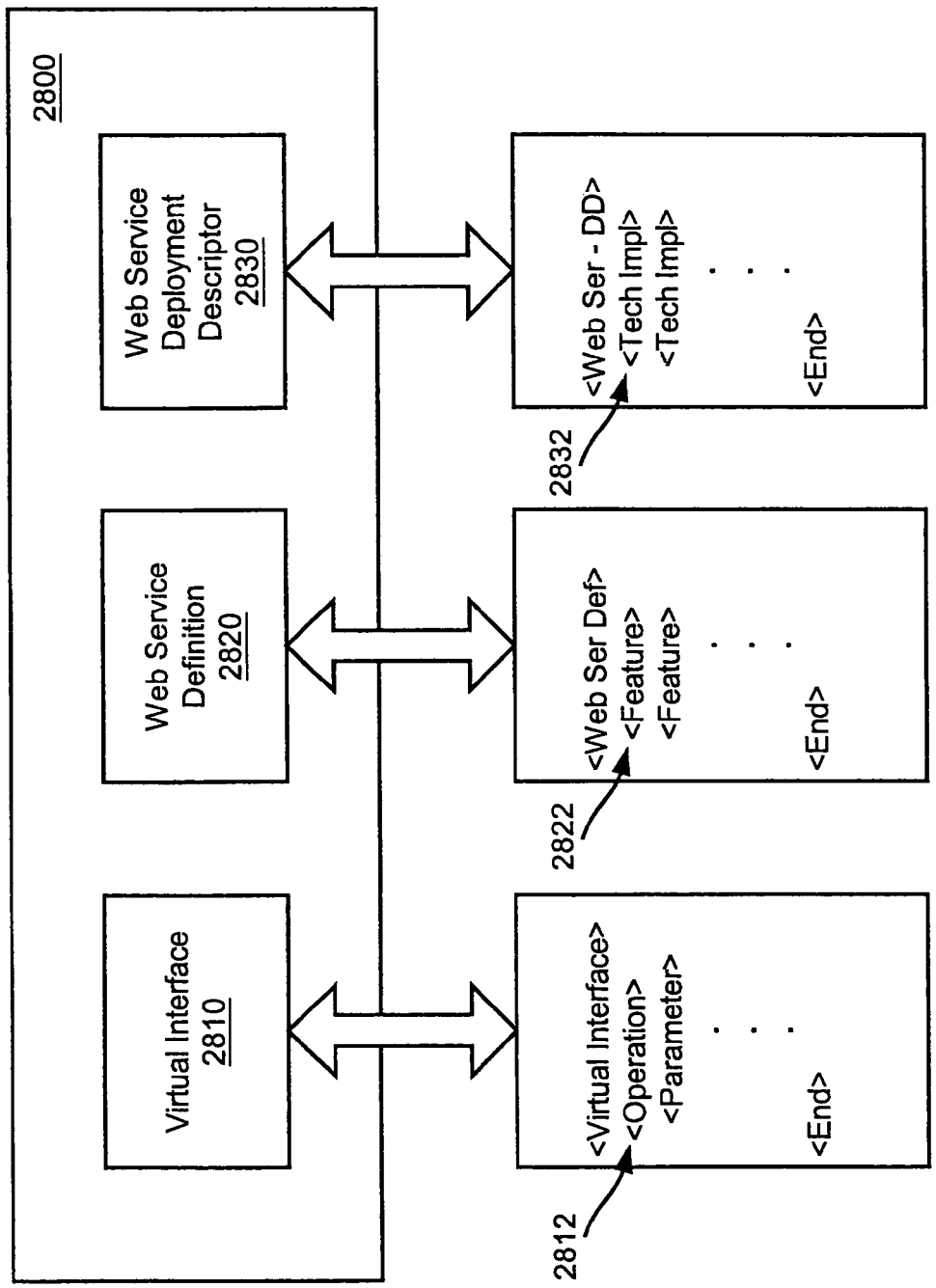
FIG. 28 illustrates selected aspects of Web service archive 2800, implemented according to an embodiment of the invention.

FIG. 28 illustrates selected aspects of Web service archive 2800, implemented according to an embodiment of the invention. Web service archive 2800 includes virtual interface 2810, Web service definition 2820, and Web service deployment descriptor 2830. In an embodiment, virtual interface 2810 is a software entity (e.g., a module, XML file, etc) having one or more elements that define which operations (and/or which parameters) of a Web service are available. The phrase "defining virtual interface 2810" broadly refers to inserting and/or manipulating the information in virtual interface 2810 (e.g., information element 2812). In an embodiment, Web service definition 2820 is a software element (e.g., a module, XML file, etc) having one or more elements that specify features of virtual interface 2810. The phrase "creating Web service definition 2820" broadly refers to inserting and/or manipulating the information in Web service definition 2820 (e.g., information element 2822). Similarly, Web service deployment descriptor 2830 may be a software entity (e.g., a module, XML file, etc) having one or more elements that specify the technical implementations of Web service definition 2820. Creating Web service deployment descriptor 2830 broadly refers to inserting and/or manipulating the information in Web service deployment descriptor 2830 (e.g., information element 2832).

Figure 29:
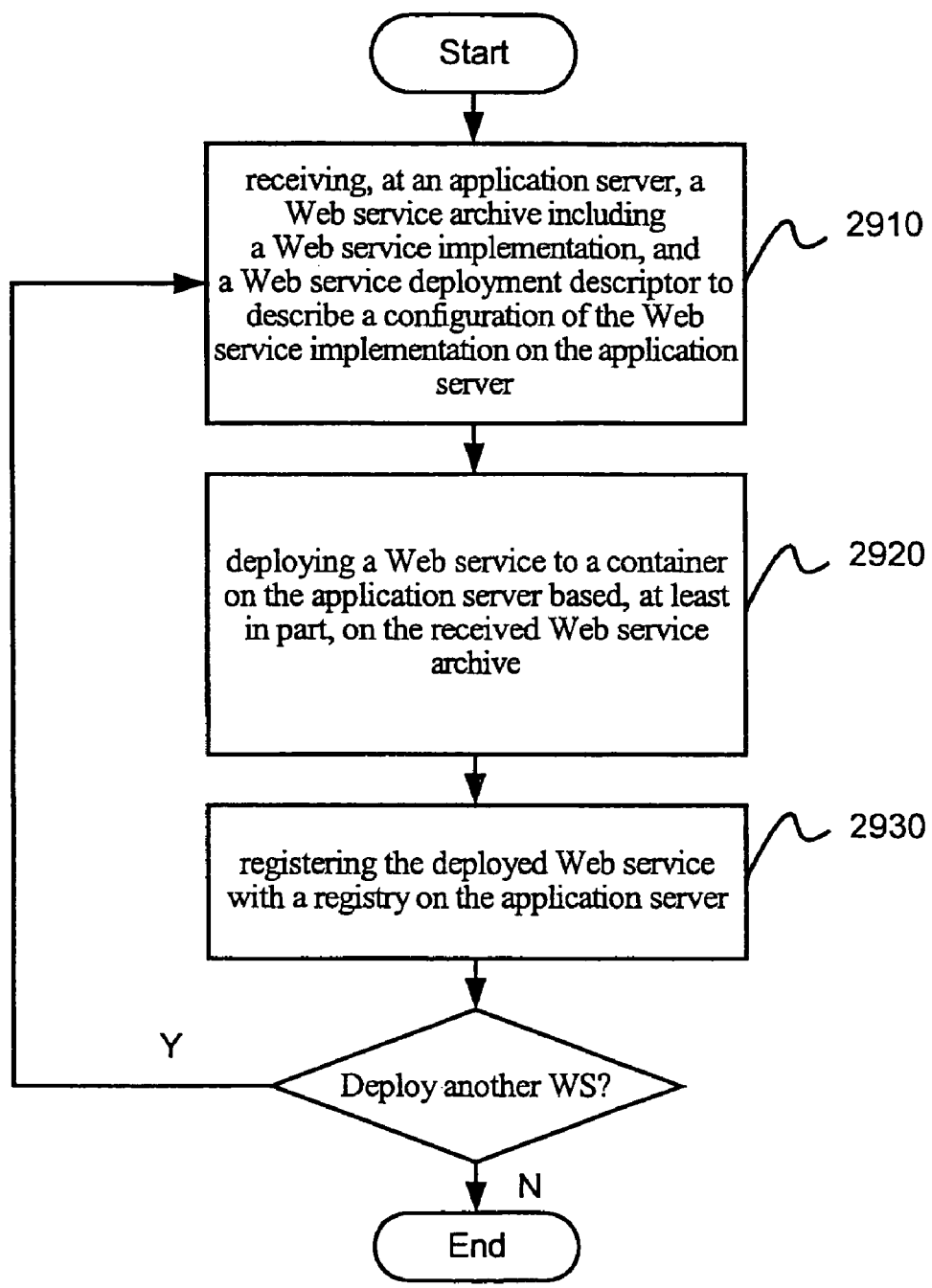
FIG. 29 is a flow diagram illustrating selected aspects of deploying a Web service archive, according to an embodiment of the invention.

FIG. 29 is a flow diagram illustrating selected aspects of deploying a Web service archive, according to an embodiment of the invention. Referring to process block 2910, an application server receives a Web service archive. In an embodiment, the Web service archive includes a Web service implementation and a Web service deployment descriptor. The Web service implementation may be, for example, an Enterprise Java Bean (EJB), a Java class, a C-sharp implementation, etc. The Web service deployment descriptor may describe a configuration of the Web service implementation for the application server that received the Web service archive. Describing a configuration of a Web service implementation for the application server refers to, for example, specifying a communication protocol implementation and/or a security protocol implementation for the Web service that is supported by the application server. For example, in an embodiment, the received Web service deployment descriptor specifies a transport binding for the Web service that is supported by the application server. The specified transport binding may be, for example, HTTP, HTTPS, FTP, SMTP, SOAP over HTTP, SOAP over HTTPS, SOAP over FTP, SOAP over SMTP, at the like. Similarly, the deployment descriptor may specify that Web service messages be authenticated by, for example, an implementation of a certificate protocol. The deployment descriptor may also include other information that is specific to the receiving application server such as an address for the configuration of on the application server (e.g., a URL) and/or a name for the configuration.

In an alternative embodiment, the received Web service archive includes a Web service implementation, one or more virtual interfaces, one or more Web service definitions, and one or more Web service deployment descriptors. In such an embodiment, each virtual interface may provide one or more operations of the Web service implementation. The term "provide one or more operations" refers to selectively providing an interface for one or more of the Web service operations described in the Web service implementation.

Each Web service definition, in turn, may specify a behavior for a virtual interface. The term "specify a behavior" refers to specifying an abstract function that is to be provided by the virtual interface. The specified function is abstract in that it is independent of a specific technical implementation. In an embodiment, the specified behavior may be an authentication function, an authorization function, a session function, a transport guarantee function, and the like.

In an embodiment, the Web service deployment descriptor provides configuration information that specifies how to implement an abstract Web service definition on a particular computing device (e.g., a particular application server). For example, in an embodiment, each Web service deployment descriptor specifies a technical protocol implementation to implement the abstract functionality described in a corresponding Web service definition. In an embodiment, the provided configuration information includes specifying which transport binding to use, specifying an address (e.g., URL) for the configuration, specifying a security protocol implementation (e.g., an authorization protocol implementation), specifying a name for the configuration, and the like.

Figure 30:
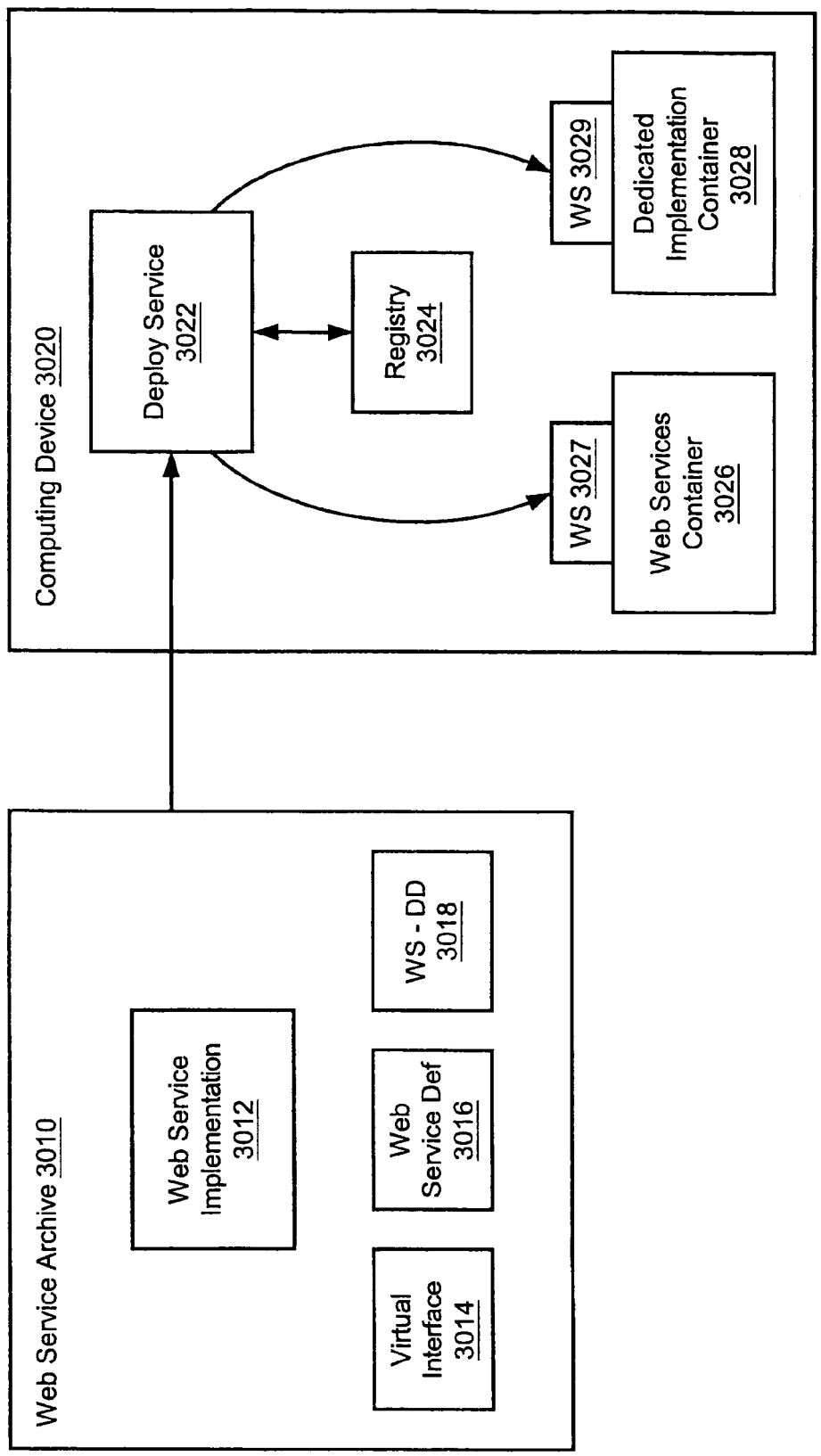
FIG. 30 illustrates selected elements of deploying Web service archive 3010 onto computing device 3020.

Referring to process block 2920 a Web service is deployed to a container on the application server that received the Web service archive. The term "deploy" refers to unpacking a Web service archive and placing the unpacked files in, for example, a directory of an application server. In an embodiment, the term "deploy" also refers to generating specific data to provide support, for example, for SOAP access and WSDL for each Web service. FIG. 30 illustrates selected elements of deploying Web service archive 3010 onto computing device 3020. In an embodiment, computing device 3020 includes deploy service 3022. Deploy service 3022 performs a number of tasks related to packing and unpacking Web service archive 3010. In an embodiment, deploy service 3022 passes Web service archive 3010 to Web service container 3026 and/or dedicated implementation container 3028. In an embodiment in which some (or all) of the files within Web service archive 3010 are compressed, deploy service 3022 may decompress the files before coping them to, for example, Web service container 3026 and dedicated implementation container 3028.

A "container" refers to a logical entity that provides services to software (e.g., a Web service). The provided service may include security, connectivity, lifecycle management, transactions, persistence, and the like. A container may also provide access to Application Program Interfaces (APIs) such as messaging APIs, registry APIs, Remote Procedure Call (RPC) APIs, and the like. For additional information about containers see, for example, the J2EE Standard. A Web services container provides services to one or more Web services. Deployed Web service 3027 illustrates a Web service based, at least in part, on Web service archive 3010 that is deployed on Web services container 3026.

A "dedicated implementation container" refers to a container that provides services to a particular Web service implementation. A dedicated implementation container may be for example an Enterprise Java Bean (EJB) container or a servlet container. An EJB is a J2EE based business component and may be a session bean, an entity bean, a message driven bean, and the like. An EJB container is a container that provides services to an EJB deployed within it. The term "servlet" refers to Java programming language classes that dynamically process requests and construct responses. A servlet container is a container that provides services to a servlet deployed within it. Deployed Web service 3029 illustrates a Web service based, at least in part, on Web service archive 3010 that is deployed on dedicated implementation container 3028.

In an embodiment, deploy service 3022 may register each deployed Web service with registry 3024. In an embodiment, registry 3024 is a local registry that is part of the Web service runtime. In one embodiment, each container within computing device 3020 has its own deploy module. In such an embodiment, deploy service 3022 may use the deploy module to deploy a Web service to, for example, dedicated implementation container 3028. Deploy service 3022 may also obtain a name for each registered Web service (e.g., a context) and provide the name to the container (e.g., Web service container 3026 and/or dedicated implementation container 3028).

Web service archive 3010 includes one or more software entities that provide, at least in part, a Web service. The illustrated embodiment of Web service archive 3010 includes Web service implementation 3012, Virtual interface 3014, Web service definition 3016, and Web service deployment descriptor 3018. In an embodiment, Web service implementation 3012 may be, for example, an EJB or a Java class that is in an archive format (e.g., a Java Archive (JAR) file). In an embodiment, virtual interface 3014, Web service definition 3016, and/or Web service deployment descriptor 3018 are XML files. In an embodiment, Web service archive 3010 is an Enterprise Archive (EAR). In an alternative embodiment, Web service archive 3010 may be based on a C sharp implementation.

Referring again to FIG. 29, the deployed Web service is registered with a registry on the application server. In an embodiment, the deployed Web service is automatically registered by a deploy service (e.g., deploy service 3022, shown in FIG. 30). In an embodiment, the registry is a local registry that is part of the Web service runtime. In an embodiment, the registry provides a name that is mapped to the Web service. In such an embodiment the deploy service (e.g., deploy service 3022, shown in FIG. 30) may provide the name to the container in which the Web service is deployed.

Figure 31:
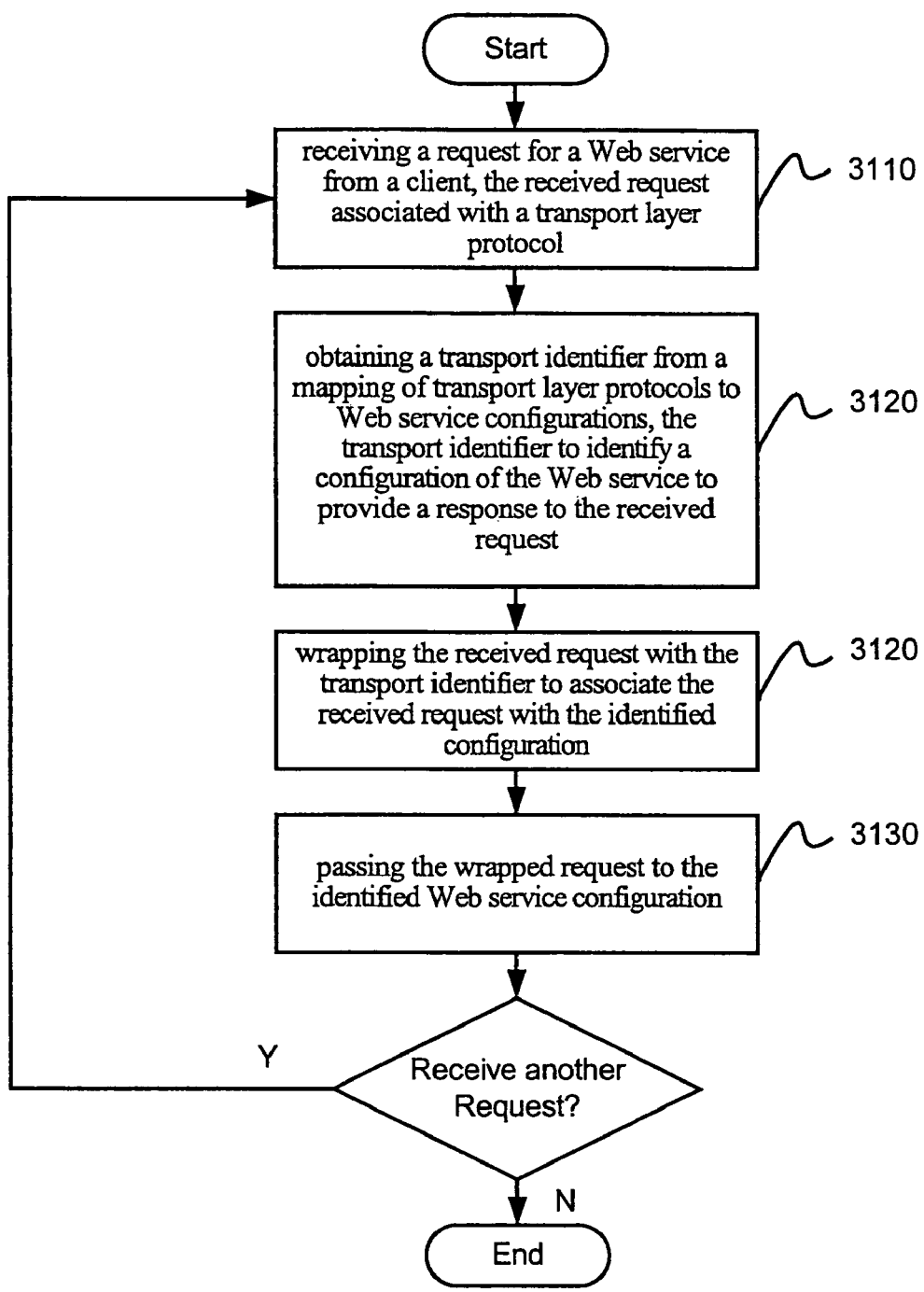
FIG. 31 is a flow diagram illustrating selected aspects of processing a request for a Web service at runtime, according to an embodiment of the invention.

FIG. 31 is a flow diagram illustrating selected aspects of processing a request for a Web service at runtime, according to an embodiment of the invention. Referring to process block 3110, a computing device receives a request for a Web service from a client. The term "a request for a Web service" broadly refers to a message, packet, frame, object, etc. from a client that indicates the client is invoking a Web service. In an embodiment, the received request is formatted for a particular transport layer protocol. For example, the received request may be formatted in accordance with HTTP, FTP, STMP, SOAP over HTTP, and the like. The term "associated with a transport layer protocol" refers to receiving a request that is formatted in accordance with a transport layer protocol. In an embodiment, the received request is an HTTP servlet request from a Web service client. An "HTTP servlet request" refers to a request from a servlet that supports an HTTP protocol. Servlets are further discussed below with reference to FIG. 32.

In an embodiment, the Web service implementation (as well as the Web service definition, and the virtual interface) is independent of the transport layer protocol. When the Web service is deployed on a computing device, one or more configurations for the Web service implementation may be defined for the computing device. Each configuration may specify, for example, a transport binding, mapping of abstract design-time features to runtime protocol implementations, security configuration, target address, an the like. When a request is received for a deployed Web service, a mechanism is needed specify which configuration of the Web service should be used to process the received request.

In an embodiment, a transport protocol maps the received request to a particular Web service configuration. For example, the transport protocol may receive a request that is associated with a particular transport layer protocol and map that request to a particular configuration. The transport protocol may then obtain a transport identifier that identifies the Web service configuration. The obtained transport identifier may be wrapped around the received message to associate the received message with the identified configuration. The Web service runtime processing is further described with reference to FIG. 32.

Figure 32:
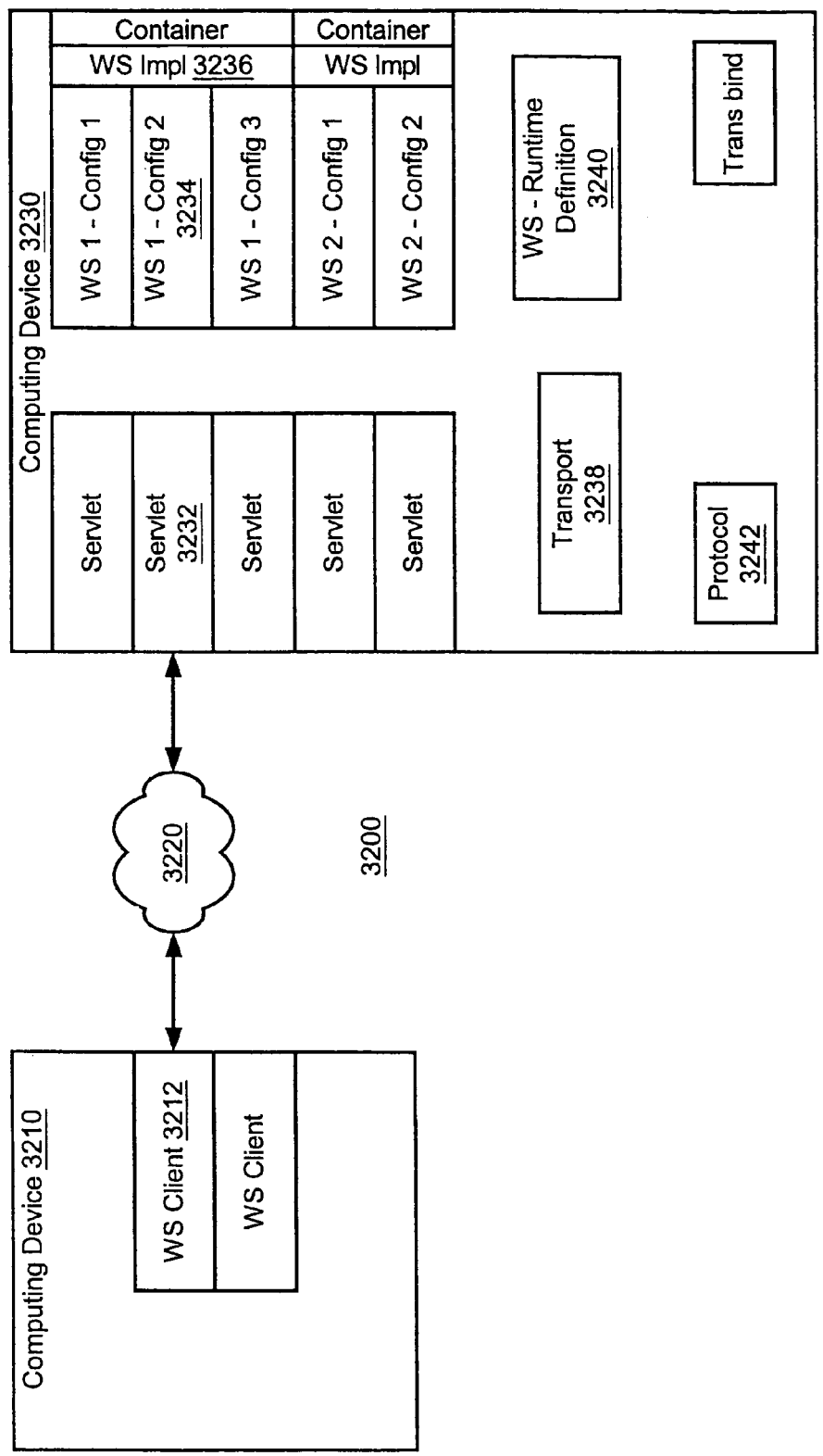
FIG. 32 illustrates selected elements of Web service framework 3200 having a Web service runtime implemented according to an embodiment of the invention.

FIG. 32 illustrates selected elements of Web service framework 3200 having a Web service runtime implemented according to an embodiment of the invention. Web service framework 3200 includes client computing device 3210 and server computing device 3230 which are connected by network 3220. In an embodiment, client computing device 3210 may be any of a variety of general or specialized computing devices including a desktop computer, laptop computer, telephone, personal digital assistant, application server, and the like. The label "client" is merely shorthand for describing one of the relationships between computing devices 3210 and 3230 and does not preclude computing device 3210 from being a server to another computing device. Client computing device 3210 includes Web service client 3212.

Web service client 3212 may send a request for a Web service to server computing device 3230 over network 3220. Network 3220 may be, for example, a wired or wireless Local Area Network (LAN), Wide Area Network (WAN), Metropolitan Area Network (MAN), and/or the Internet. The request for a Web service may be, for example, a request/response message, a Remote Procedure Call (RPC), a notification message, and/or a solicit/response message that invokes a Web service on computing device 3230.

In an embodiment, computing device 3230 receives the request for service at, for example, servlet 3232. Computing device 3230 may be, for example, an application server. In an embodiment, computing device 3230 is a J2EE application server. In an alternative embodiment, computing device 3230 may be implemented according to a different architecture. The illustrated embodiment of computing device 3230 includes servlet 3232, Web service configuration 3234, Web service implementation 3236, transport 3238, Web service runtime implementation 3240, and protocol(s) 3242.

A servlet is a reusable application (e.g., a reusable Java application) that runs on an application server. In an alternative embodiment, the request for service may be received by, for example, an applet or any other entity suitable for detecting transport layer traffic. In the illustrated embodiment, servlet 3232 receives messages for a Web service configuration 3234.

In an embodiment, servlet 3232 sends the received request to transport 3238. Transport 3238 is an entity that acquires the request, wraps it inside a transport object, and provides the wrapped request to Web service runtime 3240. In an embodiment, web service runtime 3240 uses the transport object to determine that configuration 3234 and Web service implementation 3236 should be invoked.

Web service runtime definition 3240 is the runtime implementation of a Web service. Web service runtime definition 3240 determines, for example, which protocol(s) 3242 to invoke based on the information in configuration 3234. Similarly, Web service runtime definition 3240 invokes a response from Web service implementation 3236 based, at least in part, on the wrapped request. Since Web service runtime definition 3240 identifies which configuration, and/or protocol, and/or implementation to invoke based on the transport object, it processes the wrapped response without regard for the underlying transport protocol.

Referring again to FIG. 31, the computing device obtains a transport identifier from a mapping of transport layer protocols to Web service configurations at process block 3120. For example, if a received request is a SOAP over HTTP request, it is assigned a transport object that identifies a particular configuration of the Web service. In an embodiment, the mapping is a function of a pluggable transport service (e.g., transport 3238, shown in FIG. 32).

Referring to process block 3120, the computing device wraps the received request with the transport identifier. The term "wrapping" broadly refers to encapsulating, appending, and/or subtending data or software to the received request. In an embodiment, the wrapped request may be described as "associated" with a Web service configuration because the transport object (e.g., the "wrapper") identifies the configuration.

Referring to process block 3130, the wrapped request is passed to the identified Web service configuration. In an embodiment, passing the wrapped request to the identified "Web service configuration" refers to passing the wrapped request to a Web service runtime that implements the configuration of the Web service that is specified by the configuration (e.g., specified by configuration 3234). For example, passing the wrapped request to a Web service runtime that invokes the protocols and Web service implementation that are specified by the configuration.

Figure 33:
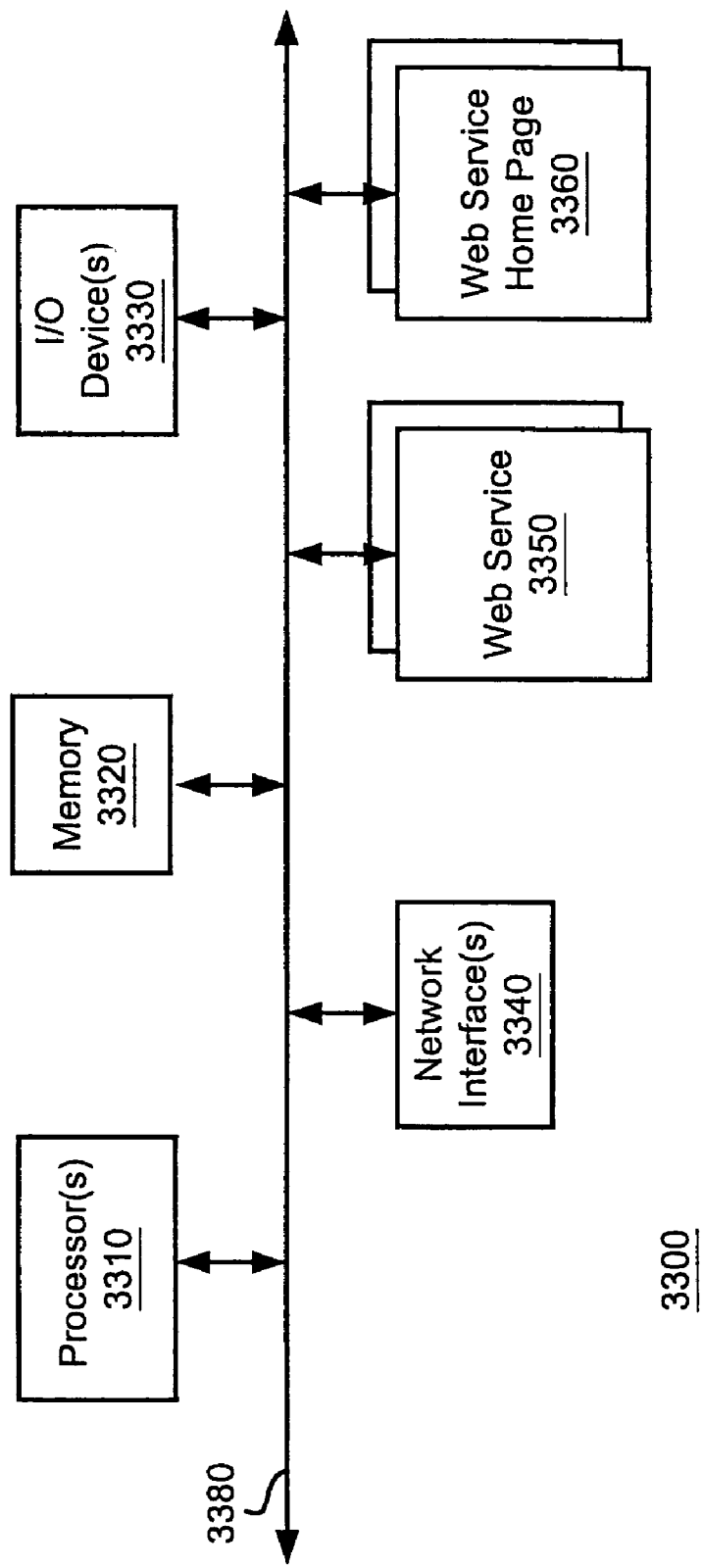
FIG. 33 is a block diagram of node 3300 implemented according to an embodiment of the invention.

FIG. 33 is a block diagram of node 3300 implemented according to an embodiment of the invention. Node 3300 may include: processor(s) 3310, memory 3320, one or more Input/Output devices 3330, network interface(s) 3340, Web service 3350, and Web service homepage 3360. The illustrated elements may be connected together through system interconnection 3380. Processor(s) 3310 may include a microprocessor, microcontroller, field programmable gate array (FPGA), application specific integrated circuit (ASIC), central processing unit (CPU), programmable logic device (PLD), and similar devices that access instructions from system storage (e.g., memory 3320), decode them, and execute those instructions by performing arithmetic and logical operations.

Web service 3350 enables node 3300 to provide one or more Web services. Web service 3350 may be executable content, control logic (e.g., ASIC, PLD, FPGA, etc.), firmware, or some combination thereof, in an embodiment of the invention. In embodiments of the invention in which Web service 3350 is executable content, it may be stored in memory 3320 and executed by processor(s) 3310.

Memory 3320 may encompass a wide variety of memory devices including read-only memory (ROM), erasable programmable read-only memory (EPROM), electrically erasable programmable read-only memory (EEPROM), random access memory (RAM), non-volatile random access memory (NVRAM), cache memory, flash memory, and other memory devices. Memory 3320 may also include one or more hard disks, floppy disks, ZIP disks, compact disks (e.g., CD-ROM), digital versatile/video disks (DVD), magnetic random access memory (MRAM) devices, and other system-readable media that store instructions and/or data. Memory 3320 may store program modules such as routines, programs, objects, images, data structures, program data, and other program modules that perform particular tasks or implement particular abstract data types that facilitate system use.

One or more I/O devices 3330 may include a hard disk drive interface, a magnetic disk drive interface, an optical drive interface, a parallel port, serial controller or super I/O controller, serial port, universal serial bus (USB) port, a display device interface (e.g., video adapter), a network interface card (NIC), a sound card, modem, and the like. System interconnection 3380 permits communication between the various elements of node 3300. System interconnection 3380 may include a wide variety of signal lines including one or more of a memory bus, peripheral bus, local bus, host bus, bridge, optical, electrical, acoustical, and other propagated signal lines.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

What is claimed is:

1. In a client-server architecture, a method comprising:
providing, at a server of the client-server architecture, a Web service having a plurality of operations available to a plurality of clients of the client-server architecture via a plurality of underlying ports of the Web service, wherein each underlying port of the Web service defines (a) the plurality of operations of the Web service available via the underlying port, (b) the communication protocol and/or bindings used by the operations available through the respective underlying port of the Web service, and (c) one or more messages used by the plurality of operations of the Web service available via the respective underlying port;
accessing, via a client of the plurality of clients in the client server architecture, a logical port to a service endpoint interface at the server, wherein the service endpoint interface provides the plurality of clients access to the plurality of operations of the Web service through the plurality of underlying ports of the Web service, and wherein the logical port comprises an abstraction of an underlying port of the plurality of underlying ports of the Web Service available to the client through the service endpoint interface;
selecting, at the client, an item of configuration information in the logical port to configure the logical port to access a first subset of the plurality of operations of the Web service from the client through the logical port to the service endpoint interface, wherein the service endpoint interface provides the access to the first subset of the plurality of operations of the Web service through at least one of the plurality of underlying ports of the Web service;
accessing, from the client, the first subset of the plurality of operations of the Web service through the logical port based on the configuration of the logical port, wherein the first subset of the plurality of operations are accessed through the configured logical port to the service endpoint interface which has access to the underlying port of the Web service;
providing, at a second client of the client-server architecture, access to the plurality of operations of the Web service through the service endpoint interface to the second client by configuring a second logical port to the service endpoint interface, wherein configuring the second logical port to the service endpoint interface configures access to a second subset of the plurality of operations of the Web service through a second underlying port of the Web service via the service endpoint interface, the second subset of the plurality of operations of the Web service being different at least in part than the first subset of the plurality operations; and
accessing the second subset of the plurality of operations of the Web service through the second logical port configured at the second client.

2. The method of claim 1, further comprising providing a value for the selected item of configuration information to define, at least in part, a configuration of the logical port, wherein the value comprises:
an access address for the configuration of the logical port.

3. The method of claim 2, wherein the access address for the configuration of the logical port comprises: a Uniform Resource Locater (URL) for the configuration of the logical port.

4. The method of claim 1, further comprising providing a value for the selected item of configuration information to define, at least in part, a configuration of the logical port, wherein the value for the selected item of configuration information comprises: an authentication type for the configuration of the logical port.

5. The method of claim 4, wherein the authentication type for the configuration of the logical port comprises: one or more of client certificates for the configuration of the logical port.

6. The method of claim 1, further comprising providing a value for the selected item of configuration information to define, at least in part, a configuration of the logical port, wherein the value for the selected item of configuration information comprises: a transport guarantee for the configuration of the logical port.

7. The method of claim 6, wherein the transport guarantee for the configuration of the logical port comprises: an encryption type for the configuration of the logical port.

8. The method of claim 7, wherein the specified encryption type is a Secure Socket Layer protocol based encryption type.

9. The method of claim 1, further comprising providing a value for the selected item of configuration information to define, at least in part, a configuration of the logical port, wherein the value for the selected item of configuration information defines a name for the configuration of the logical port.

10. A non-transitory computer-accessible storage medium having instructions stored thereon that, when executed in a client-server architecture, cause a client and a server to execute a method comprising:
providing, at the server of the client-server architecture, a Web service having a plurality of operations available to a plurality of clients of the client-server architecture via a plurality of underlying ports of the Web service, wherein each underlying port of the Web service defines (a) the plurality of operations of the Web service available via the underlying port, (b) the communication protocol and/or bindings used by the operations available through the respective underlying port of the Web service, and (c) one or more messages used by the plurality of operations of the Web service available via the respective underlying port;
accessing, via a client of the plurality of clients in the client server architecture, a logical port to a service endpoint interface at the server, wherein the service endpoint interface provides the plurality of clients access to the plurality of operations of the Web service through the plurality of underlying ports of the Web service, and wherein the logical port comprises an abstraction of an underlying port of the plurality of underlying ports of the Web Service available to the client through the service endpoint interface;
selecting, at the client, an item of configuration information in the logical port to configure the logical port to access a first subset of the plurality of operations of the Web service from the client through the logical port to the service endpoint interface, wherein the service endpoint interface provides the access to the first subset of the plurality of operations of the Web service through at least one of the plurality of underlying ports of the Web service;
accessing, from the client, the first subset of the plurality of operations of the Web service through the logical port based on the configuration of the logical port, wherein the first subset of the plurality of operations are accessed through the configured logical port to the service endpoint interface which has access to the underlying port of the Web service;

providing, at a second client of the client-server architecture, access to the plurality of operations of the Web service through the service endpoint interface to the second client by configuring a second logical port to the service endpoint interface, wherein configuring the second logical port to the service endpoint interface configures access to a second subset of the plurality of operations of the Web service through a second underlying port of the Web service via the service endpoint interface, the second subset of the plurality of operations of the Web service being different at least in part than the first subset of the plurality operations; and accessing the second subset of the plurality of operations of the Web service through the second logical port configured at the second client.

11. The non-transitory computer-accessible storage medium of claim 10, wherein the item of configuration provides a HyperText Transfer Protocol (HTTP) proxy address for a configuration of the logical port.

12. The non-transitory computer-accessible storage medium of claim 10, wherein the item of configuration provides an access address for a configuration of the logical port.

13. The non-transitory computer-accessible storage medium of claim 10, wherein the item of configuration provides a Uniform Resource Locator (URL) for a configuration of the logical port.

14. The non-transitory computer-accessible storage medium of claim 10, wherein the item of configuration to specifies an authentication type for a configuration of the logical port.

15. The non-transitory computer-accessible storage medium of claim 12, wherein the item of configuration specifies a transport guarantee for a configuration of the logical port.

16. The non-transitory computer-accessible storage medium of claim 10, wherein the item of configuration to specifies a name for a configuration of the logical port.

17. A client device executing a Web service client within a client-server architecture, wherein the Web service client comprises:

a logical port to access a Web service provided by a server within the client-server architecture, the Web service having a plurality of operations available to the Web service client of the client-server architecture via a plurality of underlying ports of the Web service, wherein each underlying port of the Web service defines (a) the plurality of operations of the Web service available via the underlying port, (b) the communication protocol and/or bindings used by the operations available through the respective underlying port of the Web service, and (c) one or more messages used by the plurality of operations of the Web service available via the respective underlying port;

the Web service client to access a service endpoint interface at the server through the logical port, wherein the service endpoint interface provides the Web service client access to the plurality of operations of the Web service through the plurality of underlying ports of the Web service, and wherein the plurality of underlying ports of the Web service, and wherein the logical port comprises an abstraction of an underlying port of the plurality of underlying ports of the Web service available to the Web service client through the service endpoint interface;

the Web service client to select an item of configuration in the logical port to configure the logical port to access a first subset of the plurality of operations of the Web service through the service endpoint interface at the server, wherein the service endpoint interface provides access to the first subset of the plurality of operations of the Web service through at least one of the plurality of underlying ports of the Web service;

a second logical port to access a second subset of the plurality of operations of the Web service through the service endpoint interface at the server wherein the service endpoint interface provides access to the second subset of the plurality of operations of the Web service through at least one of the plurality of underlying ports of the Web service via the service endpoint interface, the second subset of the plurality of operations of the Web service being different at least in part than the first subset of the plurality of operations; and the Web service client to select an item of configuration in the second logical port to configure the second logical port to access the second subset of the plurality of operations of the Web service.

18. The client device of claim 17, wherein the Web service client specifies a HyperText Transfer HyperText Transfer Protocol (HTTP) proxy for configuring the logical port.

19. The client device of claim 17, wherein the Web service client specifies an access address for configuring the logical port.

20. The client device of claim 19, wherein the specified access address is a Uniform Resource Locator (URL) for configuring the logical port.

21. The client device of claim 17, wherein the Web service client specifies an authentication type for configuring the logical port.

22. The client device of claim 21, wherein the specified authentication type is a certificate based authentication type.

23. The client device of claim 17, wherein the Web service client specifies a name for configuring the logical port.

24. The client device of claim 17, wherein the Web service client specifies a transport layer security protocol to be implemented for configuring the logical port.

25. The client device of claim 24, wherein the specified transport layer security protocol is based on a Secure Socket Layer protocol.

* * * * *